US012620156B2

(12) United States Patent
Santesteban Garay et al.

(10) Patent No.: US 12,620,156 B2
(45) Date of Patent: May 5, 2026

(54) LEARNING OF GARMENT DEFORMATIONS IN A COLLISION-FREE SPACE

(71) Applicant: SEDDI, INC., New York, NY (US)

(72) Inventors: Igor Santesteban Garay, Madrid (ES); Miguel Ángel Otaduy Tristán, Madrid (ES); Dan Casas Guix, Madrid (ES); Nils Thuerey, Garching (DE)

(73) Assignee: SEDDI, INC., New York, NY (US)

( * ) Notice: Subject to any disclaimer, the term of this patent is extended or adjusted under 35 U.S.C. 154(b) by 186 days.

(21) Appl. No.: 18/290,290

(22) PCT Filed: May 11, 2021

(86) PCT No.: PCT/ES2021/070325
§ 371 (c)(1),
(2) Date: Nov. 10, 2023

(87) PCT Pub. No.: WO2022/238593
PCT Pub. Date: Nov. 17, 2022

(65) Prior Publication Data
US 2024/0331251 A1     Oct. 3, 2024

(51) Int. Cl.
*G06T 13/40*     (2011.01)
*G06T 19/20*     (2011.01)

(52) U.S. Cl.
CPC .............. *G06T 13/40* (2013.01); *G06T 19/20* (2013.01); *G06T 2210/16* (2013.01); *G06T 2219/2021* (2013.01)

(58) Field of Classification Search
CPC ..... G06T 13/40; G06T 19/20; G06T 2210/16; G06T 2219/2021; G06T 2210/12; G06T 13/20
See application file for complete search history.

(56) References Cited

PUBLICATIONS

Patel et al., "TailorNet: Predicting Clothing in 3D as a Function of Human Pose, Shape and Garment Style," CVPR 2020. (Year: 2020).*
Ma et al., "Learning to Dress 3D People in Generative Clothing," CVPR 2020. (Year: 2020).*
Gundogdu et al., "GarNet: A Two-Stream Network for Fast and Accurate 3D Cloth Draping," ICCV 2019. (Year: 2019).*
Pons-Moll et al., "ClothCap: Seamless 4D Clothing Capture and Retargeting," SIGGRAPH 2017. (Year: 2017).*

(Continued)

*Primary Examiner* — Daniel F Hajnik
*Assistant Examiner* — Adeel Bashir
(74) *Attorney, Agent, or Firm* — Marton Ribera Schumann & Chang LLP; Chien-Ju Alice Chuang

(57) ABSTRACT

Systems and methods are provided that learn garment deformations such that they are essentially collision free. A diffused, volumetric body model representation of the underlying body together with the construction of a subspace for the garment model that yields a differentiable, canonical space configuration. This subspace is used for the regression of the garment model deformation and its dynamics. In this way, garment model deformations are predicted avoiding collisions, and the complexity for inference is reduced, such that a learned representation yields higher quality than previously achievable. The generated garments exhibit a large amount of spatial and temporal detail, and can be produced extremely quickly via the pre-trained networks.

23 Claims, 6 Drawing Sheets

PREPROCESSING PIPELINE 100

(56) References Cited

PUBLICATIONS

Wang et al., "Learning an Intrinsic Garment Space for Interactive Authoring of Garment Animation," SIGGRAPH 2019. (Year: 2019).*

Guan et al., "DRAPE: Dressing Any Person," ACM TOG 2012. (Year: 2012).*

Wang et al., "Learing an Intrinsic Garment Space for Interactive Authoring of Garment Animation," ACM Transactions on Graphics, vol. 38 No. 6, Nov. 8, 2019, pp. 1-12.

Shi et al, "Learning a Shared Deformation Space for Efficient Design-Preserving Garment Transfer", Graphical Models, vol. 115, May 1, 2021, 22 pgs. 101106.

Vidaurre et al., "Fully Convolutional Graph Neural Networks for Parametric Virtual Try-On," arxiv.org, Sep. 10, 2020, 12 pgs.

Li et al., "Deep Physics-Aware Inference of Cloth Deformation for Moncular Human Performance Capture", arxiv.org, Nov. 25, 2020, 12 pgs.

International Application No. PCT/ES2021/070325, International Search Report and Written Opinion mailed Feb. 4, 2021, 16 pages.

* cited by examiner

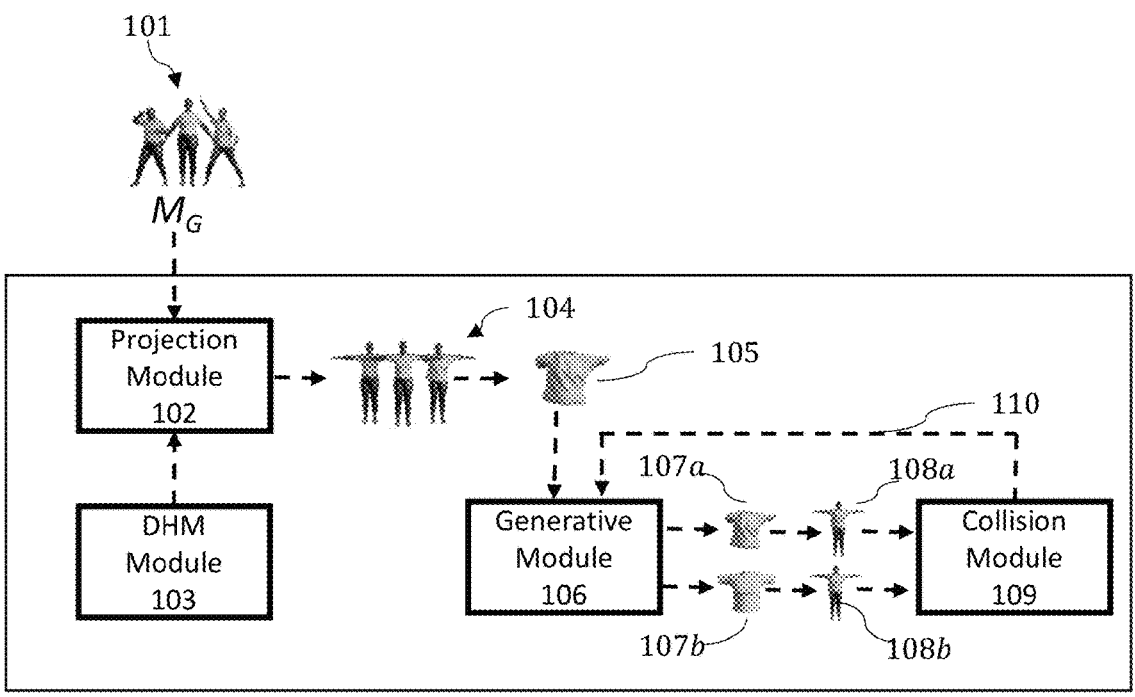
PREPROCESSING PIPELINE 100         FIG. 1
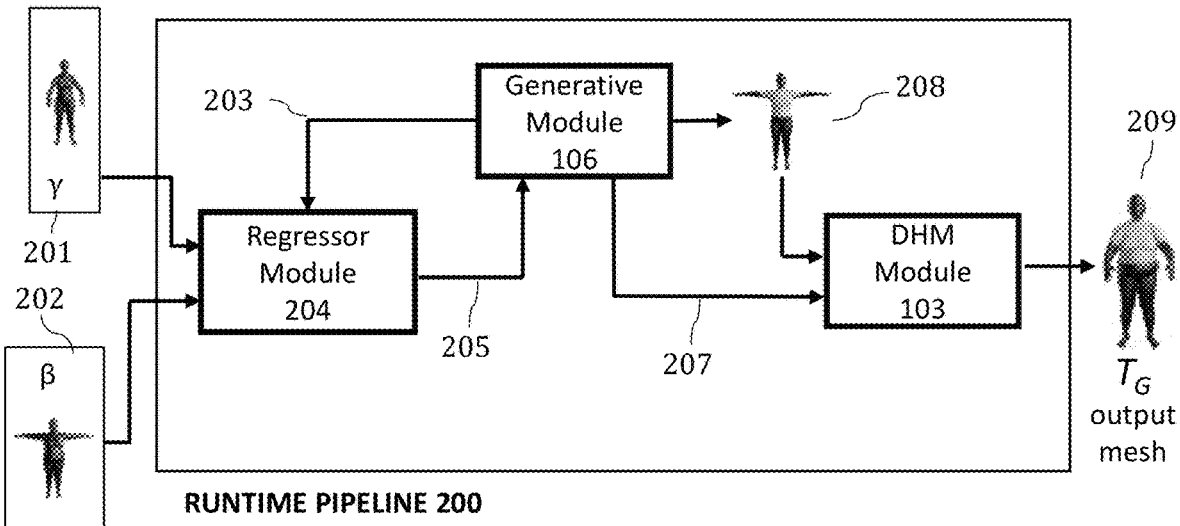
RUNTIME PIPELINE 200
FIG. 2

Input Physically-Simulated Data
500

Generate Training Data
501

Learn Projection Function
502

Learn Inverse Function
503

Generate Garment Deformations
504

*Time*

LEARNING OF GARMENT DEFORMATIONS IN A COLLISION-FREE SPACE

CROSS-REFERENCE TO RELATED APPLICATIONS

The present application is a national phase entry under 35 U.S.C. § 371 of International Patent Application No. PCT/ES2021/070325 titled "Learning of Garment Deformations in a Collision-Free Space," filed on May 11, 2021, all of which is incorporated herein by reference in its entirety.

BACKGROUND

This disclosure generally relates to computer modeling systems, and more specifically to a system and method for simulating clothing to provide a data-driven model for animation of clothing for virtual try-on.

Clothing plays a fundamental role in our everyday lives. When we choose clothing to buy or wear, we guide our decisions based on a combination of fit and style. For this reason, the majority of clothing is purchased at brick-and-mortar retail stores, after physical try-on to test the fit and style of several garments on our own bodies.

Computer graphics technology promises an opportunity to support online shopping through virtual try-on animation, but to date virtual try-on solutions lack the responsiveness of a physical try-on experience. Beyond online shopping, responsive animation of clothing has an impact on fashion design, video games, and interactive graphics applications as a whole.

One approach to produce animations of clothing is to simulate the physics of garments in contact with the body. While this approach has proven capable of generating highly detailed results [85, 94, 89, 77], it comes at the expense of significant runtime computational cost. On the other hand, it bears no or little preprocessing cost, hence it can be quickly deployed on almost arbitrary combinations of garments and body shapes and motions. To fight the high computational cost, interactive solutions sacrifice accuracy in the form of coarse cloth discretizations, simplified cloth mechanics, or approximate integration methods. Continued progress on the performance of solvers is bringing the approach closer to the performance needs of virtual try-on [59].

An alternative approach for cloth animation is to train a data-driven model that computes cloth deformation as a function of body motion [95, 78]. This approach succeeds to produce plausible cloth folds and wrinkles when there is a strong correlation between body pose and cloth deformation. However, it struggles to represent the nonlinear behavior of cloth deformation and contact in general. Most data-driven methods rely to a certain extent on linear techniques, hence the resulting wrinkles deform in a seemingly linear manner (e.g., with blending artifacts) and therefore lack realism.

Most previous data-driven cloth animation methods work for a given garment-avatar pair, and are limited to representing the influence of body pose on cloth deformation. In virtual try-on, however, a garment may be worn by a diverse set of people, with corresponding avatar models covering a range of body shapes. Other methods that account for changes in body shape do not deform the garment in a realistic way, and either resize the garment while preserving its style [15, 76], or retarget cloth wrinkles to bodies of different shapes [42, 87].

These prior techniques rely on some approaches that are the basis upon which the present virtual try-on disclosure improves, including some forms of physics-based simula-tion, early data-driven models, and related work that is further described below. For example, conventional physics-based simulation of clothing entails three major processes: computation of internal cloth forces, collision detection, and collision response; and the total simulation cost results from the combined influence of the three processes. One attempt to limit the cost of simulation has been to approximate dynamics, such as in the case of position-based dynamics [3]. While approximate methods produce plausible and expressive results for video game applications, they cannot transmit the realistic cloth behavior needed for virtual try-on.

Another line of work, which tries to retain simulation accuracy, is to handle efficiently both internal forces and collision constraints during time integration. One example is a fast GPU-based Gauss-Seidel solver of constrained dynamics [12]. Another example is the efficient handling of nonlinearities and dynamically changing constraints as a superset of projective dynamics [90]. More recently, Tang et al. [59]designed a GPU-based solver of cloth dynamics with impact zones, efficiently integrated with GPU-based continuous collision detection.

A different approach to speed up cloth simulation is to apply adaptive remeshing, focusing simulation complexity where needed [89]. Similar in spirit, Eulerian-on-Lagrangian cloth simulation applies remeshing with Eulerian coordinates to efficiently resolve the geometry of sharp sliding contacts [96].

Similarly, inspired by early works that model surface deformations as a function of pose [LCF00, SRIC01], some existing data-driven methods for clothing animation also use the underlying kinematic skeletal model to drive the garment deformation [86, 95, 15, 97, 81]. Kim and Vendrovsky [86] introduced a pose-space deformation approach that uses a skeletal pose as subspace domain. Hahn et al. [81] went one step further and performed cloth simulation in pose-dependent dynamic low-dimensional subspaces constructed from precomputed data. Wang et al. [95] used a precomputed database to locally enhance a low-resolution clothing simulation based on joint proximity.

Other methods produce detailed cloth animations by augmenting coarse simulations with example-based wrinkle data. Rohmer et al. [92] used the stretch tensor of a coarse animation output as a guide for wrinkle placement. Kavan et al. [22] used example data to learn an upsampling operator that adds fine details to a coarse cloth mesh. Zurdo et al. [73] proposed a mapping between low and high-resolution simulations, employing tracking constraints [74] to establish a correspondence between both resolutions. More recently, Oh et al. [91] have shown how to train a deep neural network to upsample low-resolution cloth simulations.

A different approach for cloth animation is to approximate full-space simulation models with coarse data-driven models. James and Fatahalian [82] used efficient precomputed low-rank approximations of physically-based simulations to achieve interactive deformable scenes. De Aguiar et al. [78] learned a low-dimensional linear model to characterize the dynamic behavior of clothing, including an approximation to resolve body-cloth collisions. Kim et al. [84] performed a near-exhaustive precomputation of a cloth's state throughout the motion of a character. At run-time a secondary motion graph was explored to find the closest cloth state for the current pose. However, this method cannot generalize to new motions. Xu et al. [97] used a precomputed dataset to mix and match parts of different samples to synthesize a garment mesh that matches the current pose.

However, virtual try-on requires cloth models that respond to changes in body pose and shape in real time, as different users, through corresponding avatars try on the garment, changing pose, turning around, etc. to see the fit of the garment from different perspectives. Current data-driven cloth animation methods do not provide satisfactory results. Guan et al. [15] dressed a parametric character and independently modeled cloth deformations due to shape and pose. However, they relied on a linear model that struggles to generate realistic wrinkles, specially under fast motions. Moreover, they accounted for body shape by resizing the cloth model, which is a major drawback for virtual try-on. Other works also apply a scaling factor to the garment to fit a given shape, without realistic deformation [68, 42, 87]. This hinders the ability for a user to try on a given size garment and see its fit on the user's body shape. In essence, the prior methods automatically resize the garment to a different size that fits the model, which defeats the purpose of the virtual try-on for the given garment size.

In another line of work, taking advantage of the recent improvements on performance capture methods [75, 98, 42], virtual animation of real cloth that has been previously captured (and not simulated) has become an alternative. Initial attempts fit a parametric human model to the captured 3D scan to enable the re-animation of the captured data, without any explicit cloth layer [83, 11]. More elaborate methods extract a cloth layer from the captured 3D scan and fit a parametric model to the actor [68,88,42,87]. This allows editing the actor's shape and pose parameters while keeping the same captured garment or even changing it.

However, re-animated motions lack realism since they cannot predict the nonrigid behavior of clothing under unseen poses or shapes that could take place when a user tries on a garment, and are usually limited to copying wrinkles across bodies of different shapes [42, 87], not generating the wrinkles that would be caused by the different shaped bodies.

In yet another approach, cloth animation and virtual try-on methods have also been explored from an image-based point of view [93, 99, 80, 79, 18]. These methods aim to generate compelling 2D images of dressed characters, without dealing with any 3D model or simulation of any form. Hilsmann et al. [79] proposed a pose-dependent image-based method that interpolates between images of clothes. More recently, Han et al. [18] have shown photo-realistic results using convolutional neural networks. However, image-based methods are limited to 2D static images and fixed camera position, and cannot fully convey the 3D fit and style of a garment.

To solve these shortcomings a prior approach was provided for a learning-based clothing animation method and system for highly efficient virtual try-on simulations as described in WO2020131518A1, incorporated herein by reference. Using this approach, given a garment, the system preprocess a rich database of physically-based dressed character simulations, for multiple body shapes and animations.

Then, using a database, the system trains a learning-based model of cloth drape and wrinkles, as a function of body shape and dynamics. A model separates global garment fit, due to body shape, from local garment wrinkles, due to both pose dynamics and body shape. A recurrent neural network regresses garment wrinkles, and the system achieves highly plausible nonlinear effects. However, this approach still required a post-processing step to remove any collisions between the garment and body models.

Thus, what is needed, is a data-driven approach to modeling realistic garments on a collision-free space applicable to different body shapes and different poses without the need of post-processing to remove body-garment collisions and operable in real-time to enable a realistic virtual try-on experience.

BRIEF SUMMARY

According to various embodiments of the present invention, virtual try-on system and method is provided.

According to one embodiment, a learning-based method for cloth animation is provided that meets the needs of virtual try-on, as it models the deformation of a given garment as a function of body motion and shape.

New Claims

According to embodiments, systems for generating a digital representation of clothing on a body are provided. These system comprise one or more processors and non-transitory computer readable media. The non-transitory computer readable media includes instructions that when executed by the processor configures the processor to perform the claimed method steps of the various methods provided. In embodiments, the processors may be distributed, including a plurality of processing units communicatively coupled via a computer network.

BRIEF DESCRIPTION OF THE DRAWINGS

FIG. 1 is a block diagram illustrating a pre-processing pipeline in a learning-based data-driven system according to embodiments of the disclosure.

FIG. 2 is a block diagram illustrating a runtime pipeline in a learning-based data-driven system according to embodiments of the disclosure.

DETAILED DESCRIPTION

Figure 3:
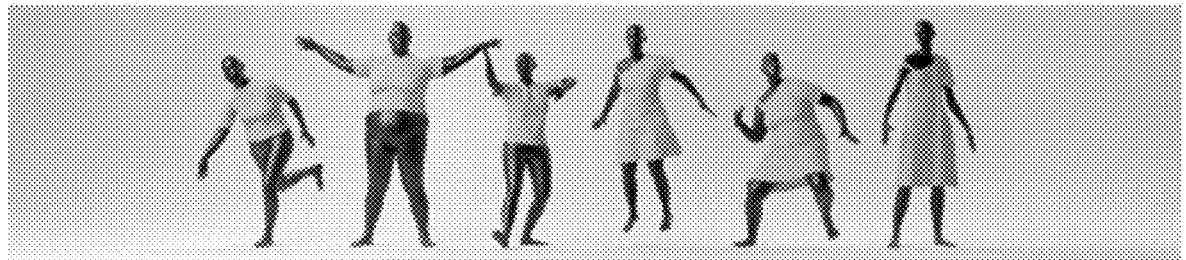
FIG. 3 is an illustration of computer generated simulations of multiple avatars with two garments deformed according to embodiments of the disclosure.

The above and other needs are met by the disclosed methods, a non-transitory computer-readable storage medium storing executable code, and systems for 3D modeling of clothing and cloth items in computer applications such as virtual try-on, but may be used in other applications, including, for example, garment design and virtual modeling, motion capture applications, biomechanics and ergonomics design and simulation, education, business, virtual and augmented reality shopping, and entertainment applications, including animation and computer graphics for digital movies, interactive gaming and videos, human, animal, or character simulations, virtual and augmented reality applications, robotics, and the like. The high quality of the simulation of garments generated by this invention and the differentiable nature of the systems and methods of this invention are applicable to a large number of highly interesting applications from virtual try-on applications, as for example described in [18], to inverse problems in computer vision, as for example described in [25] (both references incorporated herein as part of this disclosure). For example, the collision-free approach according to this disclosure may be applied not only to body-to-garment collisions but also to collisions between multiple layers of clothing.

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

According to the embodiments described herein, a system and method for learning garment deformations in a collision-free space is provided. In embodiments, a function is learned to predict how a 3D garment dynamically deforms given a target human body pose and shape. In contrast to existing methods, embodiments of the invention provide a model that directly outputs a collision-free garment geometry that does not interpenetrate with the underlying human body. The output garment modeled is physically correct after inference without requiring post-processing to remove garment-body collisions. In these embodiments, the final state is not compromised in terms of the regressed garment details such as wrinkles and dynamics.

According to one aspect in embodiments, an extension of standard statistical human body models is provided that learns to smoothly diffuse skinning surface parameters, such as rigging weights and blendshape correctives, to any point in 3D space.

These learned diffused skinning parameters can be leveraged to define a novel garment deformation model. According to embodiments, the system and method allows for the removal of deformations already captured by the diffused body model to build an unposed and deshaped canonical space of garments. In this space, garments appear in rest pose and mean shape but pose- and shape-dependent wrinkle details are preserved. According to another aspect of embodiments, a novel optimization-based strategy is provided to project physics-based simulations to the canonical space of garments. The use of the learned diffuse skinning parameters enables the correct representation of complex phenomena such as garment-body sliding or loose clothing.

Using projected physics-based simulations as ground truth data, a generative space of garment deformations can be learned according to embodiments. A self-supervised loss function that is enabled by the canonical space of garments allows the exhaustive sampling of random instances of garment deformations (i.e., arbitrary shape, pose, and dynamics for which ground truth data is unavailable) and testing of collisions against a constant body mesh. According to embodiments, a neural-network-based regressor is provided that outputs deformed garments with dynamics, that do not interpenetrate the body, as a function of body shape and motion.

Referring now to FIG. 1, a diagram of a pre-processing pipeline in a learning-based data-driven system to animate the clothing of a virtual character according to embodiments is provided. According to one embodiment, a learning-based system is provided to augment a skinning-based character animation with realistic nonlinear garment deformations learned in a collision-free space. A pre-processing pipeline 100 may be used to generate ground-truth training data 104 that then is used to train a generative neural module 106. In some embodiments, a generative neural module 106 may be trained directly with simulation data 101 based on a parametric or non-parametric body model. In addition, in some embodiments, the preprocessing pipeline 100 may generate and train a Diffuse Human Model neural module 103. In embodiments, pre-processing pipeline 100 may be implemented with one or more hardware and/or software modules, alone or in combination with other devices. In one embodiment, pre-processing pipeline 100 includes software modules implemented with a computer program product comprising a computer-readable medium containing computer program code, which can be executed by one or more computer processors, including CPUs and GPUs, for performing the steps, operations, or processes described herein.

According to some embodiments, simulation data 101, such as for example frames of physics-based simulations of multiple animated bodies wearing the same garment, may be provided as input to a projection module 102 in the pre-processing pipeline 100. The projection module 102 projects the simulation data 101 to an unposed canonical space based on a set of diffused parameters from a Diffused Human Model (DHM) module 103. It should be noted that in other embodiments, a non-parametric body model may be used. The output ground-truth training data 104 is provided in the canonical space without introduction of any collisions between the garment and body models in the simulation data 101. In some embodiments, the input simulation data 101 may be based on user-defined parameters to provide a simulated clothing item. For example, different knit types, different fabric compositions (e.g., cotton, polyester, wool, linen, silk, etc.) with single fabrics or mixes of fabrics in different ratios, and the like. In one embodiment, a T-shirt may be simulated using an interlock knit with 60% cotton and 40% polyester. In other embodiments, the simulation data 101 is used without projecting it to the unposed canonical space.

In some embodiments in which the simulation data 101 is projected to the canonical space, from the canonical space ground-truth data 104, a ground-truth garment model 105 is defined that is capable of representing the deformations naturally present in real garments, including dynamics, high-frequency wrinkles, and garment-skin sliding. In these embodiments, the ground-truth garment model 105 in the pre-processing pipeline 100 may be used to train a Generative Module 106 that is subsequently used in a runtime pipeline. The Generative Module 106 may include neural network submodules that are trained with the ground-truth garment model data. In embodiments, the Generative Module 106 includes an encoder submodule and a decoder submodule. The decoder submodule includes a decoder neural network that is trained to avoid collisions in a self-supervised fashion. The decoder submodule generates reconstructed garment model instances 107a that are applied to the body model 108a and are then checked for collisions in Collision Module 109 using a self-supervised loss approach. Similarly, the decoder exhaustively samples random instances of garment deformations 107b (i.e., arbitrary shape, pose, and dynamics for which ground truth data is unavailable) which are applied to the body model 108b and tested for collisions against the constant body mesh in Collision Module 109.

Referring now to FIG. 2, a diagram of a runtime pipeline in a learning-based data-driven system to animate the clothing of a virtual character according to embodiments is provided. According to one embodiment, a learning-based system is provided to augment a skinning-based character animation with realistic nonlinear garment deformations learned in a collision-free space. A runtime pipeline 200 is used to generate garment deformations in real-time given a body model. For example, in some embodiments, a parametric body model is used that includes body shape and body motion parameters. In these embodiments, a set of body shape and dynamic inputs are applied to a given garment model in the runtime pipeline 200. In embodiments, runtime pipeline 200 may be implemented with one or more hardware and/or software modules, alone or in combination with other devices. In one embodiment, pre-processing pipeline 100 includes software modules implemented with a computer program product comprising a computer-readable medium containing computer program code, which can be executed by one or more computer processors, including CPUs and GPUs, for performing the steps, operations, or processes described herein.

According to embodiments, runtime pipeline 200 may model one or more garment models on a given input avatar body shape 202 for a given motion input 201. The runtime pipeline 200 can produce an output frame in which one or more garments are stretched and wrinkled over the avatar while maintaining the same size, showing a realistic virtual try-on result. This process can be repeated over multiple sets of inputs to provide a posed skinned avatar with the modeled garments for each frame of a series of frames, for example in a virtual try-on application, computer game, or other computer modeling applications. For example, a garment may be modeled on a given avatar defined by an input body shape and input body motion, causing runtime pipeline to generate garment deformations on the modeled garment due to the shape and motion of the avatar. The avatar body model input may be received via a computer network at a server implementing the runtime pipeline 200. Similarly, output video frames based on the modeling output form the runtime pipeline 200 can be transmitted via a network to a remote computer system where it may be displayed. FIG. 3 as an illustration of computer generated simulations of multiple avatars with two garments deformed via a generative module 106 in a runtime pipeline 200 that is trained to avoid collisions according to embodiments of this disclosure.

According to some embodiments, runtime pipeline 200 may include a regressor module 204 that cooperates with the previously trained Generative Module 106. The Generative Module 106 provides an encoded garment model 203 that is used to predict encoded garment deformations based on the shape 202 and motion 201 inputs and the dynamic effects of prior frames. The encoded garment deformations 205 may be processed by the decoder submodule of the Generative Module 106 to generate a canonical space representation of an unposed deformed garment model on a body model 208 given the set of body shape 202 and motion 201 inputs. The canonical space representation is then processed based on the previously trained DHM Module 103 to project the unposed canonical representation 205 to pose space and applies a skinning function based on the diffused body model parameters to generate a final animation result 209, for example, a deformed skinned body mesh of an avatar. Using this runtime pipeline 200 approach, post-processing steps are obviated and the output of the pipeline is guaranteed to provide a collision-free result.

Figure 4:
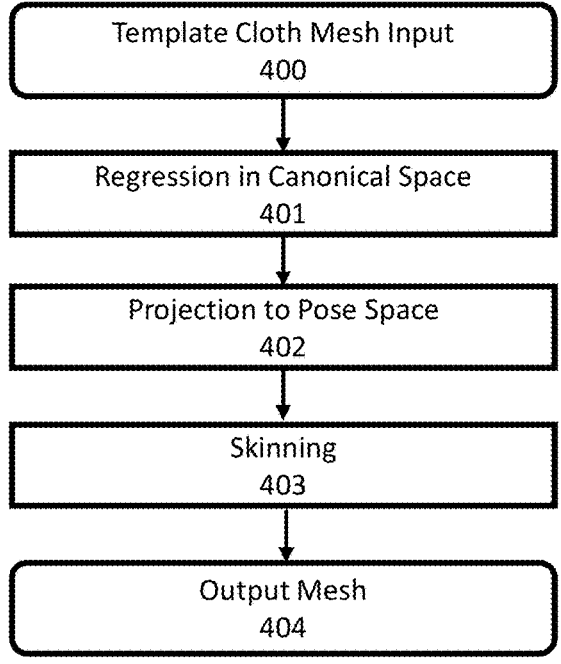
FIG. 4 is a block diagram illustrating a runtime learning-based data-driven method to animate the clothing of a virtual character according to embodiments of the disclosure.

Now referring to FIG. 4, a block diagram illustrating a learning-based data-driven method to animate the clothing of a virtual character according to embodiments is provided. In embodiments, a template cloth mesh in a canonical unposed state is input 400 along with a body model shape and motion parameters. The body model parameters are used to regress 401 the canonical space garment representation to generate a set of garment deformations in the canonical space representation of the garment. The garment deformations are projected 402 onto a diffused body model on a posed space according to the shape and motion parameters. Using the diffused body model, a skinning function 403 is applied to generate a skinned body simulation output mesh 404.

Figure 5:
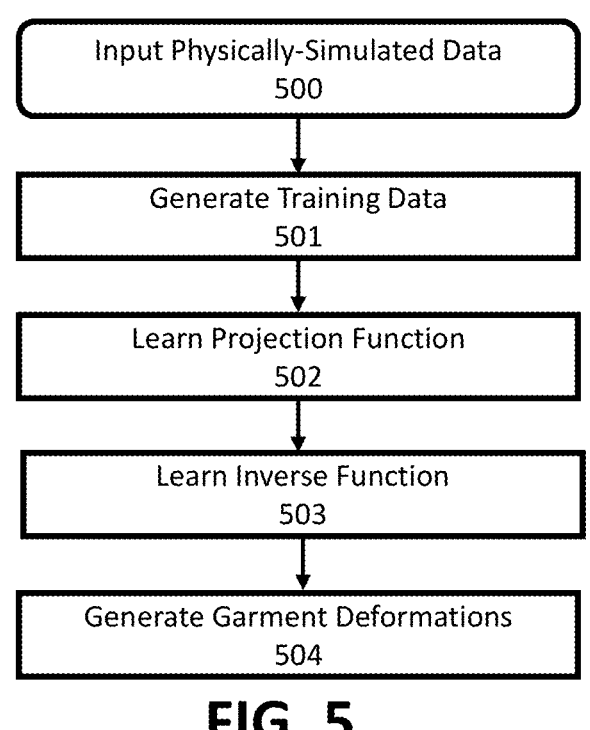
FIG. 5 is a block diagram illustrating a training process of a machine learning method to learn garment deformations in a collision-free subspace according to embodiments of the disclosure.

Now referring to FIG. 5, a block diagram illustrating a machine learning method to learn garment deformations in a collision-free subspace is provided according to embodiments. Physically-simulated garment data is input 500, including deformed garment and corresponding body model data. In some embodiments, the simulated garment data may be deformed using an optional optimization-based strategy that projects the garment data to a canonical space generating 501 training data for the machine learning method. According to these embodiments, the garment deformations may be represented in a canonical space that removes pose-and-shape deformations already modeled with an underlying human body model. In these embodiments, a human body model may be used that enables the projection and unprojection of garments from a full space to the canonical space, for example, a Diffused Human Model, further described below, may be used. In alternative embodiments, physically-simulated garment data is used as training data without projection to the canonical space.

The training data may be used to find 502/503 a generative subspace that encodes garment deformations as a function of a body model. In some embodiments, the body model may be a parametric body model, including body shape and motion parameters, and in these embodiments, the deformations may be encoded as a function of body shape and motion. The generative subspace directly produces garment configurations that do not collide with the underlying body model. In embodiments, the training process learns 502 a function that projects full space garment deformations, for example per-vertex garment displacements, into a subspace in which the garment deformations do not interpenetrate the underlying human body model. Additionally, an inverse function that projects the garment deformations from the collision-free subspace to the full space is also learned 503 during the training process. In some embodiments, the learning steps 502/503 include the learning of the projection and unprojection of garments between full space and the canonical space and between the canonical space and the collision-free subspace. For example, in one embodiment the generative subspace is learned with a variational auto-encoder that allows queries or samples of arbitrary garment deformations in canonical space. In some embodiments, the generative subspace may be further fine-tuned by randomly sampling configurations and checking for collisions with the underlying canonical body shape to effectively produce garment deformations that do not interpenetrate the body model. Once the generative subspace has been learned 502/503, it may be used to generate 503 collision-free garment deformations. For example, in embodiments, the generative subspace may be used as an output space for a regressor that deforms garment as a function of body and shape parameters.

Diffused Human Model Module

According to one aspect of embodiments of this disclosure, a Diffused Human Model (DHM) module is provided. In embodiments, DHM module may be implemented with one or more hardware and/or software modules, alone or in combination with other devices. In one embodiment, DHM module includes software implemented with a computer program product comprising a computer-readable medium containing computer program code, which can be executed by one or more computer processors, including CPUs and GPUs, for performing the steps, operations, or processes described herein.

According to embodiments, the DHM module implement a diffused human body model that extends prior approaches in order to generalize to vertices beyond the body surface. More specifically, current body models [11, 29, 21] deform a rigged parametric human template. For example, a body mesh can be assumed to be deformed according to a rigged parametric human body model:

$$M_B(\beta, \theta) = W(T_b(\beta, \theta), J(\beta), \theta, \mathcal{W}), \qquad \text{(Equation 1)}$$

where $W(\cdot)$ is a skinning function (e.g., linear blend skinning, or dual quaternion) with skinning weights $\mathcal{W}$ and pose parameters $\theta$ that deforms an unposed parametric body mesh $T_b(\beta, \theta) \in \mathbb{R}^{3 \times v_b}$ with $V_b$ vertices based on: first, the shape parameters $\beta \in \mathbb{R}^{|\beta|}$, which define joint locations of an underlying skeleton; and second, the pose parameters $\theta \in \mathbb{R}^{|\theta|}$, which are the joint angles to articulate the mesh according to a skinning weight matrix $W_b$. For example, the SMPL model [29] defines the unposed body mesh as:

$$T_B(\beta, \theta) = T_b + B_S(\beta) + B_P(\theta), \qquad \text{(Equation 2)}$$

where $T_b \in \mathbb{R}^{N_{6B} \times 3}$ is a body mesh template with NB vertices that is deformed using two blendshapes that output per-vertex 3D displacements: $B_s(\beta) \in \mathbb{R}^{N_B \times 3}$ models deformations to change the body shape; and $B_P(\theta) \in \mathbb{R}^{N_B \times 3}$ models deformations to correct skinning artifacts. Subsequent proposals additionally provide blendshapes to model soft tissue [43, 52] and garments [31, 1, 42].

Existing data-driven garment models (e.g., [53, 41]) leverage the human body models, for example as defined in Equation 1, assuming that clothing closely follows the deformations of the body. Consequently, a common approach is to borrow the skinning weights $\mathcal{W}$ to model the articulation of garments. Typically, this is done by exhaustively searching the nearest body vertex for each garment vertex in rest pose.

However, such naive static assignment process cannot correctly model complex nonrigid clothing effects and thus the resulting simulation lacks realism. The reason for this failure in the prior art is primarily twofold: first, the garment-body nearest vertex assignment must be dynamically updated, for example, when a garment slides over the skin surface; and second, the garment-body vertex assignment cannot be driven only by the closest vertex since this causes undesirable discontinuities in medial-axis areas.

According to one aspect of embodiments of this disclosure, a body model is proposed in which skinning parameters are diffused to any 3D point around the body. This approach addresses the identified weaknesses of the prior art. For example, according to one embodiment, body models formulated in Equation 2 are extended by smoothly diffusing skinning parameters to any 3D point around the body. Notably, the proposed diffusion of skinning parameters is not limited to inwards interpolation to create a volumetric mesh, as for example discussed in [23, 49]. These prior approaches result in a less smooth strategy. According to an exemplary embodiment, the functions $\tilde{\mathcal{W}}(p)$, $\tilde{B}_s(p, \beta)$, and $\tilde{B}_p(p, \theta)$, are defined to generalize skinning weights, shape blendshape offset, and pose blendshape offset, respectively, to any point $p \in \mathbb{R}^3$ by smoothly diffusing the surface values as follows:

$$\hat{\mathcal{W}}(p) = \frac{1}{N} \sum_{q_n \sim \mathcal{N}_{(p,d)}} \mathcal{W}(\phi(q_n)) \qquad \text{[Equation 3]}$$

$$\tilde{B}_S(p, \beta) = \frac{1}{N} \sum_{q_n \sim \mathcal{N}_{(p,d)}} B_s(\phi(q_n), \beta) \qquad \text{[Equation 4]}$$

$$\tilde{B}_P(p, \theta) = \frac{1}{N} \sum_{q_n \sim \mathcal{N}_{(p,d)}} B_p(\phi(q_n), \theta) \qquad \text{[Equation 5]}$$

where $\phi(p)$ computes the closest surface point $p \in \mathbb{R}^3$, d the distance from p to the surface body, and $B_p(p, \theta)$ is a function that returns the 3D offset of the vertex p computed by the blendshape $B_p$. For each point, we average the values of N neighbors and therefore mitigate potential discontinuities in areas around a medial-axis.

In order to obtain differentiable functions that seamlessly integrate into an optimization or learning process, processes for learning implicit functions are applied to learn the functions $\tilde{\mathcal{W}}(p)$, $\tilde{B}_s(p, \beta)$, and $\tilde{B}_p(p, \theta)$, with fully-connected neural networks. In embodiments, this approach can yield a very efficient evaluation on modern GPUs.

Garment Model

According to another aspect of embodiments of this disclosure, a garment model is defined that enables the learning of a generative collision-free space of garment deformations, avoiding collisions between points in the garment model and the vertices of an underlying body model, for example the Diffused Human Model described in this disclosure. The garment model according to these embodiments is capable of representing the deformations naturally present in real garments, including, for example, dynamics, high-frequency wrinkles, and garment-skin sliding.

Prior approaches to enable this type of garment modeling decoupled the deformations caused by different sources, and modeled each case independently.

For example, Santesteban et al. [53] decouple deformations due to shape and pose, and Patel et al. [41] due to shape, pose, and style. These approaches model pose-dependent deformations leveraging the skinning weights associated with the body in the unposed state and a linear blend skinning technique. This disentanglement removes many nonlinear deformations and enables to efficiently represent (and learn) deformations due to other sources directly in an unposed (i.e., normalized) state.

By contrast, in some embodiments according to this disclosure, the shape-dependent deformations that are already captured by the underlying body model can also be decoupled from the garment model. This effectively constructs a canonical unposed and deshaped representation of garments, improving the disentanglement proposed by earlier works. As noted above, this provides an exemplary approach to enable the learning of a generative space of garment deformations that do not interpenetrate the underlying body. Using this approach, a regressor R can be obtained that infers the deformations of the garment, for example, as $$X = R(\beta, \gamma) \qquad \text{[Equationn 6]}$$

where $X \in \mathbb{R}^{N_B \times 3}$ deformation in canonical space computed as a function of body shape $\beta$ and motion descriptor $\gamma$.

According to one embodiment, an unposed and deshaped garment model is formulated by leveraging the diffused skinning functions of the Diffused Human Model described in this disclosure. For example, $$M_G(X, \beta, \theta) = W(T_G(X, \beta, \theta), J(\beta), \theta, \widetilde{\mathcal{W}}(X)) \qquad \text{[Equation 7]}$$

$$T_G(X, \beta, \theta) = X + \tilde{B}_S(X, \beta) + \tilde{B}_P(X, \theta), \qquad \text{[Equation 8]}$$

where $T_G(\ )$ is the deformed garment after diffused blendshapes correctives are applied, and X are the garment deformations in canonical space.

One property of garment models according to these embodiments, can be that, given a regressor R( ) (for example as shown in Equation 6), it is well defined for all garments with any topology, thanks to the generalized diffused skinning functions. Another property of garment models according to these embodiments, can be that the skinning parameters used to articulate the garment (Equations 7 and 8) may depend on the current positions of the vertices of the unposed and deshaped deformation of the garment X. Therefore, in these embodiments, since closest garment vertices and body vertices are rigged with updated parameters, applying blendshapes and skinning operations do not introduce interpenetrations between the body and garment models. Thus, in contrast to existing methods, such as for example [53, 41], that used a static weight assignment that cannot guarantee that the rigging step does not introduce collisions, in embodiments according to this disclosure, a collision-free space is provided. In alternative embodiments, different approaches may provide a similar collision-free space, based, for example, on different diffused body models and/or different skinning functions than those of Equations 7 and 8. For example, in some embodiments, alternative garment and body models in which the closest garment vertices and body vertices are rigged with updated parameters may be provided.

Projection Module

In order to obtain ground-truth data for training a regressor that infers garment deformations, another aspect of embodiments of this disclosure involves a projection module for the projection of deformed 3D garments, for example, computed with a physics-based simulator, to an unposed and deshaped space. In embodiments, projection module may be implemented with one or more hardware and/or software modules, alone or in combination with other devices. In one embodiment, a projection module includes software implemented with a computer program product comprising a computer-readable medium containing computer program code, which can be executed by one or more computer processors, including CPUs and GPUs, for performing the steps, operations, or processes described herein.

Previous approaches formulate the projection to the unposed state as the inverse of a linear blend skinning operation, as for example described in [41, 53, 42]. However, due to the static rigging weights assignment, this operation can introduce body-garment collisions in the unposed state for frames where the garment has deformed significantly or slid in the tangential direction of the body. For example, FIG. 6 illustrates the unposing of a T-shirt and a dress in challenging poses.

Figure 6:
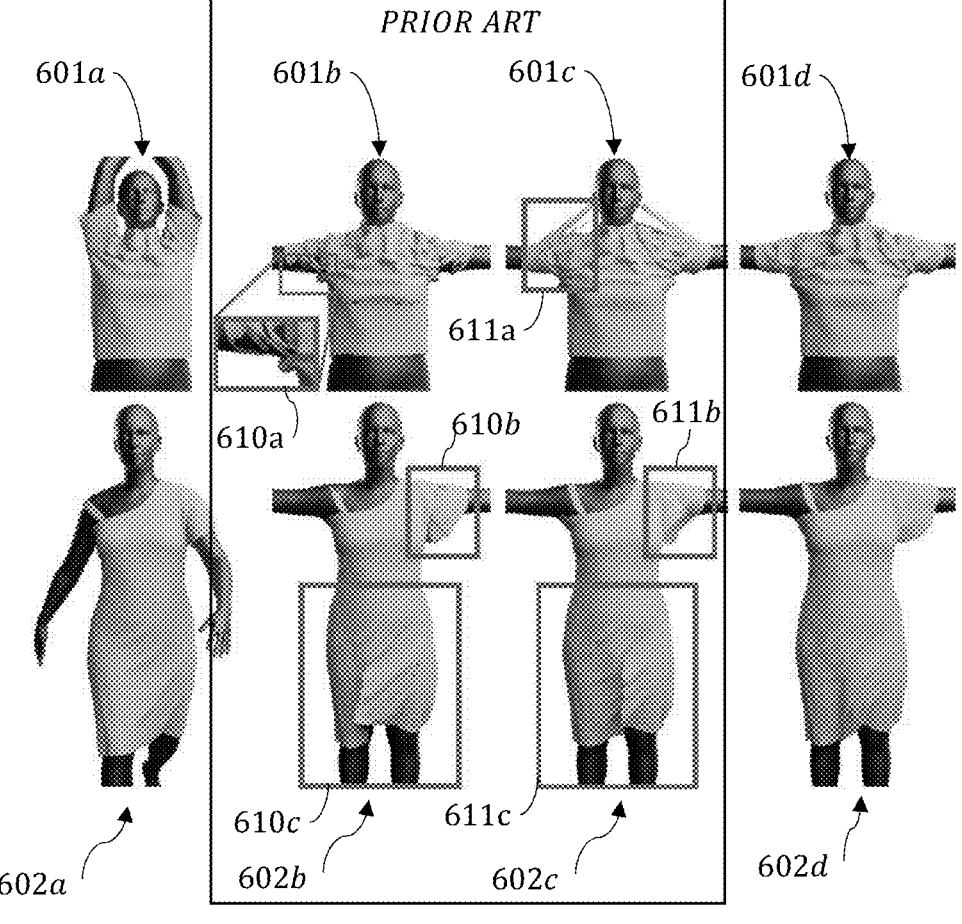
FIG. 6 is an illustration of computer generated simulations illustrating the unposing of a T-shirt and a dress in challenging poses comparing prior art to an embodiment according to this disclosure.

In FIG. 6, posed input meshes 601a and 602a illustrate a posed body model with a garment model, a T-shirt model in 601a and a dress model in 602a. Simulations 601b and 602b illustrate the unposing of garment models with constant weights, as for example, described in [41, 53]. As highlighted in the FIG. 6, simulations 601a and 601 b includes significant collisions 610a-610c between the garment and body models. Simulations 601c and 602c illustrate the unposing of garment models with variable weights assigned with nearest vertex. In these simulations 601c and 602c, collisions between the body and garment models are avoided but skinning artifacts 611a-611c are introduced and, in a video sequence (not shown) the unposed model was not temporary stable. Simulations 601d and 602d illustrate the unposing of the models according to embodiments of this invention, resulting in unposed models without collisions or artifacts.

Even if a data-driven method can potentially learn to fix these artifacts to output collision-free posed deformations, given that embodiments of this disclosure provide a collision-free projection-and-unprojection operation, the learning can be defined entirely in the unposed and deshaped state. Thus, in embodiments according to this disclosure, a strategy to project ground-truth garments to a canonical space, without introducing collisions is provided. In contrast to prior approaches, the inverse of the skinning function, for example the inverse of the function of Equation 7, should not be applied because the diffused skinning $\widetilde{\mathcal{W}}$ (X) are only defined for unposed shapes. Furthermore, exhaustive search of garment-body nearest vertices for each frame is a highly computationally expensive operation and introduces discontinuities in medial axis areas, as illustrated in FIG. 6, simulations 601c and 602c.

Therefore, according to embodiments of this disclosure, an optimization-based strategy is provided to find the optimal vertex positions of the garment in the canonical space.

According to one exemplary embodiment, given a ground-truth deformed garment mesh $M_G$, which for example may be generated with physics-based simulations or other similar approaches, with known pose $\theta$ and body shape $\beta$, its unposed and deshaped representation X may be found by minimizing $$\min_x \varepsilon_{rec} + \omega_1 \varepsilon_{strain} + \omega_2 \varepsilon_{collision} \qquad \text{[Equation 9]}$$

In the minimization objective, the data term $$\varepsilon_{rec} = \|M_G - M_G(X, \beta, \theta)\|_2^2 \qquad \text{[Equation 10]}$$

aims at reducing the difference between the simulated garment, and the unposed and deshaped representation projected back to the original state. In this embodiment, the garment mesh $M_G(X, \beta, \theta)$, for example as defined in Equation 7, is well defined for any set of 3D vertices X, and it is fully differentiable thanks to the diffused skinning parameters.

In this embodiment, the regularization term $$\varepsilon_{strain} = \left\| \frac{1}{2}(F(T_G(X, \beta, \theta))^T (F(T_G(X, \beta, \theta)) - I \right\|_2^2 \qquad \text{[Equation 11]}$$

penalizes unrealistic deformations. To measure the amount of deformation of each triangle, a strain tensor, such as for example a Green-Lagrange strain tensor, can be used. This tensor can be rotation and translation invariant. In this embodiment, F denotes the deformation gradient of each triangle.

Lastly, according to this embodiment, a term to prevent optimized vertex positions X to interpenetrate with the underlying body can be provided as follows:

$$\varepsilon_{strain} = \max(\epsilon - SDF(X), 0) \qquad \text{[Equation 12]}$$

This term requires to compute the distance to the body surface for all vertices of the deformed garment, which is usually modeled with a Signed Distance Field (SDF). However, other approaches to compute this distance can be used in alternative embodiments. In embodiments according to this disclosure, the fact that bodies in the provided canonical space are represented with a constant body mesh can be leveraged, and therefore the distance to the body surface, e.g., the SDF, is static and can be efficiently precomputed. For example, in embodiments according to this disclosure, the SDF may be learned with a shallow fully connected neural network that naturally provides a fully differentiable formulation, similar to the implicit function learning approaches described in [40, 2, 9, 55], which are incorporated herein by reference.

According to an exemplary embodiment, to optimize a sequence, the optimization process may be initialized with the result of a previous frame of a simulation video series. This not only accelerates convergence, but also contributes to stabilize the projection over time. For the first frame, the optimization process can be initialized with the garment template, which may be obtained, for example, by simulating the garment with the average body model (i.e., pose $\theta$ and body shape $\beta$ set to zero).

Generative Module

In embodiments, a Generative Module may be implemented as a neural network module with one or more hardware and/or software modules, alone or in combination with other devices. In one embodiment, Generative Module includes software implemented with a computer program product comprising a computer-readable medium containing computer program code, which can be executed by one or more computer processors, including CPUs and GPUs, for performing the steps, operations, or processes described herein. For example, such a module may be used to implement the method of FIG. 5.

According to another aspect of embodiments of this disclosure, a garment deformation regressor R( ) may be learned based on the training of a data-driven method (e.g. a neural engine). Thus, according to embodiments of this disclosure, using a garment model, such as the garment model provided in this disclosure, and based on a strategy to project ground-truth data into a canonical space, as for example described herein, a data-driven neural engine in a Generative Module may be trained to learn a regressor R( ), as for example provided by X=R ($\beta$, $\gamma$).

In data-driven methods, such as for example those described in [16, 41, 53, 64], a common source of collisions between the body and garment models can be residual errors in the optimization the data-driven process. In embodiments according to this disclosure, using a garment model that is designed in such a way that the projection/unprojection operations between canonical space and posed space does not introduce collisions, these type of residual errors can occur. For example, errors in the optimization of the regressor R( ) could lead to regressed deformed garments X with body-garment collisions in the canonical space, which would inevitably propagate to the posed space.

In order to avoid these residual errors, in embodiments according to this disclosure, a compact subspace for garment deformations is learned, for example in a Generative Module. This compact subspace is provided to reliably solve garment-body interpretations. In the unposed and deshaped canonical representation of garments in these embodiments, the underlying body shape is constant, namely, it is a body shape with pose $\theta$ and body shape $\beta$ set to zero. In one embodiment, this property enables the training of a variational autoencoder (VAE) to learn a generative space of garment deformations with a self-supervised collision loss term that is independent of the underlaying body and shape, and therefore naturally generalizes to arbitrary bodies.

For example, in one embodiment, a VAE may be trained with a loss function given by:

$$\mathcal{L}_{VAE} = \mathcal{L}_{rec} + \lambda_1 \mathcal{L}_{laplacian} + \lambda_2 \mathcal{L}_{collision} + \lambda_3 \mathcal{L}_{KL} \qquad \text{[Equation 13]}$$

According to this embodiment, the standard VAE reconstruction term is provided as $$\mathcal{L}_{VAE} = \|X - D(E(X))\|_1 \qquad \text{[Equation 14]}$$

where E( ) and D( ) are the encoder and decoder networks, respectively. Since $L_{rec}$ does not take into account the neighborhood of the vertex, an additional loss term may be provided to penalize error between the mesh laplacians (as described for example in [60, 65] which are incorporated herein by reference):

$$\mathcal{L}_{laplacian} = \|\Delta x - \Delta D(E(X))\|_1 \qquad \text{[Equation 15]}$$

Further, according to embodiments of this disclosure, to enforce a subspace free of garment-body collisions, a collision term is also provided, for example as:

$$\mathcal{L}_{collision} = \qquad \text{[Equation 16]}$$
$$\max(\epsilon - SDF(D(E(X)), 0) + \max(\epsilon - SDF(D(\bar{X}_{rand})), 0)$$

where $\bar{X}_{rand} \sim \mathcal{N}(0,1)$. In this embodiments, the first term penalizes collisions in the reconstruction of training data. The second term, max ($\in -SDF(D(\bar{X}_{rand}))$, 0), samples the latent space and, enabled by the deshaped and unposed canonical representation, checks collisions against a constant body mesh with a self-supervised strategy (i.e., ground truth garments are not required for this term). This element allows for the exhaustive sampling of the latent space and for learning a compact garment representation that reliably solves garment-body interpenetrations. As already highlighted, since a garment model according to embodiments of this disclosure is designed to not to introduce body-garment collisions in both the projection and unprojection operations, garment deformations regressed in the generative subspace do not suffer from collisions even in unseen (i.e., test) sequences.

In addition, in these embodiments, the self-supervised loss may be of limited use if the values are not sampled from the same distribution as the data. Thus, an optional additional term $\mathcal{L}_{KL}$ may also be provided to enforce a normal distribution in the latent space.

Regressing Garment Deformations According to another aspect of embodiments of this disclosure, once a generative garment subspace is learned, ground-truth data can be encoded and used to train the recurrent regressor R ($\beta$, $\gamma$), as for example given by Equation 6. According to these embodiments, this regressor R( ) can predict garment deformations as a function of body shape $\beta$ and motion $\gamma$.

In these embodiments, a motion descriptor $\gamma$ can be provided with information of the current pose $\theta$ as well as its global movement. A typical approach for encoding the pose information for a human body simulation is to use the joint rotations $\theta \in \mathbb{R}^{72}$ of the underlying human body model, but this representation suffers from several problems such as discontinuities, redundant joints, and unnecessary degrees of freedom. While in some embodiments this approach may be used, in alternative embodiments a more compact, learned pose descriptor $\bar{\theta} \in \mathbb{R}^{10}$ (as for example described in [52], incorporated herein by reference) may be used, which can generalize better. In these embodiments, the motion vector can be built for a given frame by concatenating the descriptor to the velocities and accelerations (computed with finite differences) of the pose, the global rotation K (represented as Euler angles) and translation H $$\gamma = \left\{ \bar{\theta}, \frac{d\bar{\theta}}{dt}, \frac{d^2\bar{\theta}}{dt^2}, \frac{dH}{dt}, \frac{d^2H}{dt^2}, \frac{dK}{dt}, \frac{d^2K}{dt^2} \right\} \qquad \text{[Equation 17]}$$

According to these embodiments, the regressor R( ) takes as input the motion descriptor $\gamma \in \mathbb{R}^{42}$ and the shape coefficients $\beta \in \mathbb{R}^{10}$ and predicts the encoded garment deformation $\bar{X} \in \mathbb{R}^{25}$. In some embodiments, to learn dynamic effects that depend on previous frames, Gated Recurrent Units (as for example described in [10], incorporated herein by reference) may be used as the building blocks of the overall model. In these embodiments, the regressor may be trained by minimizing the L1-error of encoded canonical space positions, velocities, and accelerations, which we find improves dynamics compared to optimizing positions alone.

$$\mathcal{L}_R = \mathcal{L}_{pos} + \rho_1 \mathcal{L}_{vel} + \rho_2 \mathcal{L}_{acc} \qquad \text{[Equation 18]}$$

Quantitative Evaluation

Figure 7:
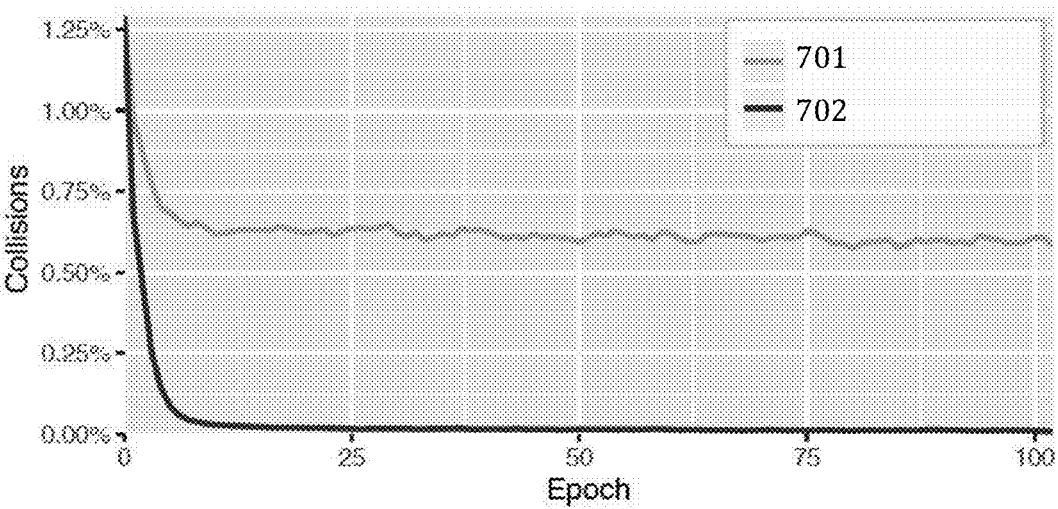
FIG. 7 is a chart illustrating a visualization of the training of a generative module of a system according to embodiments of the disclosure.

Now referring to FIG. 7, a chart illustrating a quantitative evaluation parameter of a system according to embodiments of this disclosure is provided. To quantitatively evaluate the ability of a system according to an exemplary embodiment, FIG. 7 shows the number of collisions during the training evaluated on a test set that includes 4 unseen sequences and 17 different shapes. Specifically, FIG. 7 provides a plot of an ablation study that shows the collisions remaining at each epoch of the training process when using only the supervised collision loss (i.e., 1st term of Equation 16) 701, and collisions remaining 702 when also using a self-supervision with the 2nd term of Equation 16. The latter 702 dramatically improves the collision handling, and it shows the generalization capabilities of our approach by reaching values close to 0 collisions in unseen sequences.

Figure 8:
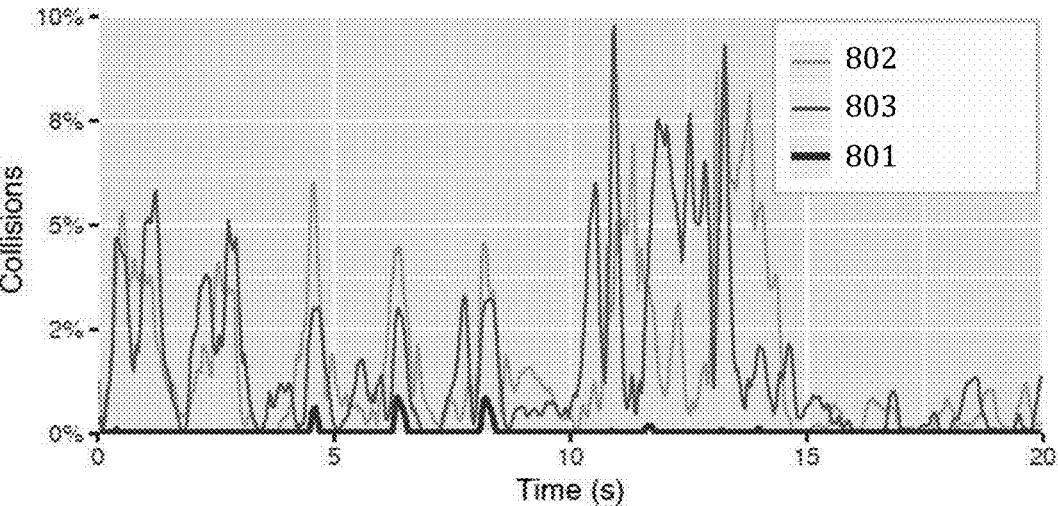
FIG. 8 is a chart illustrating a quantitative evaluation parameter of a system according to embodiments of the disclosure.

Now referring to FIG. 8, a chart illustrating another quantitative evaluation parameter of a system according to embodiments of this disclosure is provided. FIG. 8 provides a quantitative evaluation of the collisions in a test sequence from the AMASS dataset [32] (incorporated herein by reference), and compares results 801 obtained with a system according to an exemplary embodiment of this disclosure with results 802 from the recent works of Santesteban et al. [53] and results 803 from TailorNet [41]. As illustrated by results 802 and 803, these previous methods, without a postprocessing step, generate garment deformations that consistently collide with the underlying body mesh. In contrast, as results 801 show, the illustrative method according to embodiments of this disclosure directly regresses garment deformations with almost no collisions. Importantly, the primary source of the remaining collisions in results 801 are self-intersections in the body mesh already present in the AMASS dataset (e.g., a hand interpenetrates the torso) Furthermore, Table 1 provides an exhaustive ablation study of a method according to embodiments of this disclosure evaluated on unseen test sequences from AMASS [32] with 53,998 frames and 20 body shapes.

TABLE 1

|  | TailorNet | Santesteban | Embodiment 1 | Embodiment 2 | Embodiment 3 |
|---|---|---|---|---|---|
| Collisions | 5.70% | 8.80% | 0.62% | 0.24% | 0.09% |

Table 1 provides average number of collisions in 105 test motions from the AMASS dataset [32]. The TailorNet results are from the TailorNet [41] without postprocessing. The Santesteban results are from Santesteban [53] without postprocessing. Results for Embodiment 1 are from an exemplary embodiment according to this disclosure that did not include the optional Collision Loss element. Results for Embodiment 2 are from an exemplary embodiment according to this disclosure that did not include the optional Self-Supervision element. Results for Embodiment 3 are from an exemplary embodiment according to this disclosure that included two optional elements, Collision Loss and Self-Supervision elements. While all three exemplary embodiments outperform the prior art, all components of these embodiments of the disclosure, as illustrated by Embodiment 3 in Table 1, contribute to the overall performance, leading to a residual of 0.09% when using our full model. In contrast, prior methods suffer from a significantly higher number of collisions.

Qualitative Evaluation

Figure 9:
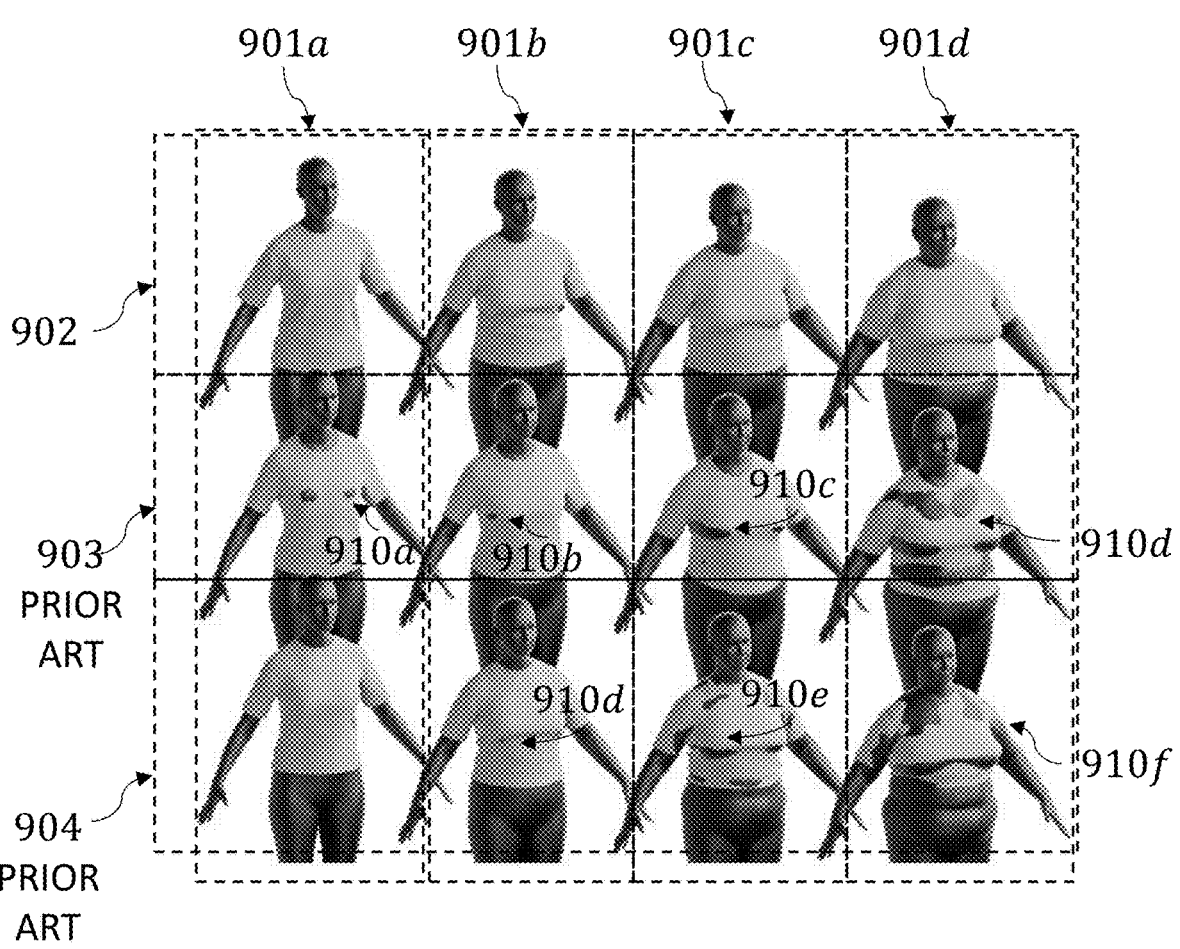
FIG. 9 is an illustration of computer generated simulations of a human body model and garment models to illustrate the generalization capabilities of embodiments of this disclosure compared to prior art approaches.

Now referring to FIG. 9, graphical illustrations of computer renderings of a human body model 901 and garment models 902, 903, and 904 are shown to illustrate the generalization capabilities of embodiments of this disclosure to unseen body shapes.

Specifically, FIG. 9 shows simulations that interpolate between 2 extremely different real shapes from the AMASS [32] dataset. The body model 901 is shown in four different shapes 901a, 901b, 901c, and 901d. The illustrations of FIG. 9 compare an embodiment of a garment model according to this disclosure 902 with two prior art data driven garment models, TailorNet [41] 903 and Santesteban et al. [53] 904.

The results in FIG. 9 are based on input shapes that are far beyond the range of the training data, therefore these results also evaluate the extrapolation capabilities of the models. The illustrations for a method according to one embodiment of this disclosure 902 show that it handles such extremely challenging cases very well and does not show visible garment-body collisions, while existing methods [53, 41] suffer from very noticeable interpenetrations 910.

Figure 10:
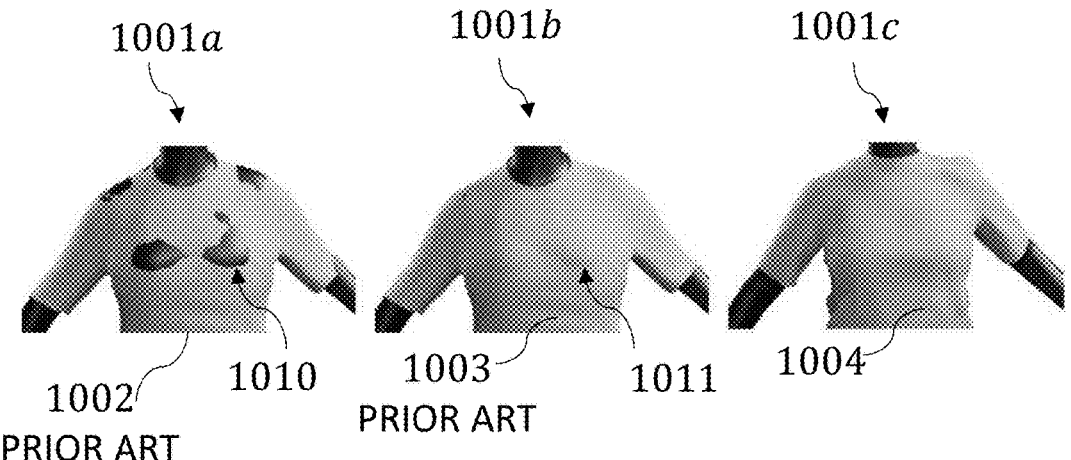
FIG. 10 is an illustration of computer generated simulations of computer renderings of a human body model with three garment models for qualitative comparison of an embodiment of this disclosure compared to prior art approaches.

Now referring to FIG. 10, an illustration of computer renderings of a human body model 1001a-1001c with three garment models 1002, 1003, and 1004 are shown for qualitative comparison. Garment model 1002 illustrates the result of the TailorNet [41] method without post-processing. Garment model 1003 is the same method adding the post-processing step. Garment model 1004 illustrates the results of a garment model according to one embodiment of this disclosure, including all optional steps. FIG. 10 shows that, although a postprocessing step can effectively mitigate the resulting collisions 1010, it can also introduce undesired discontinuities or bulges 1011 in the garment surface, as seen in the chest area of model 1003.

Figure 11:
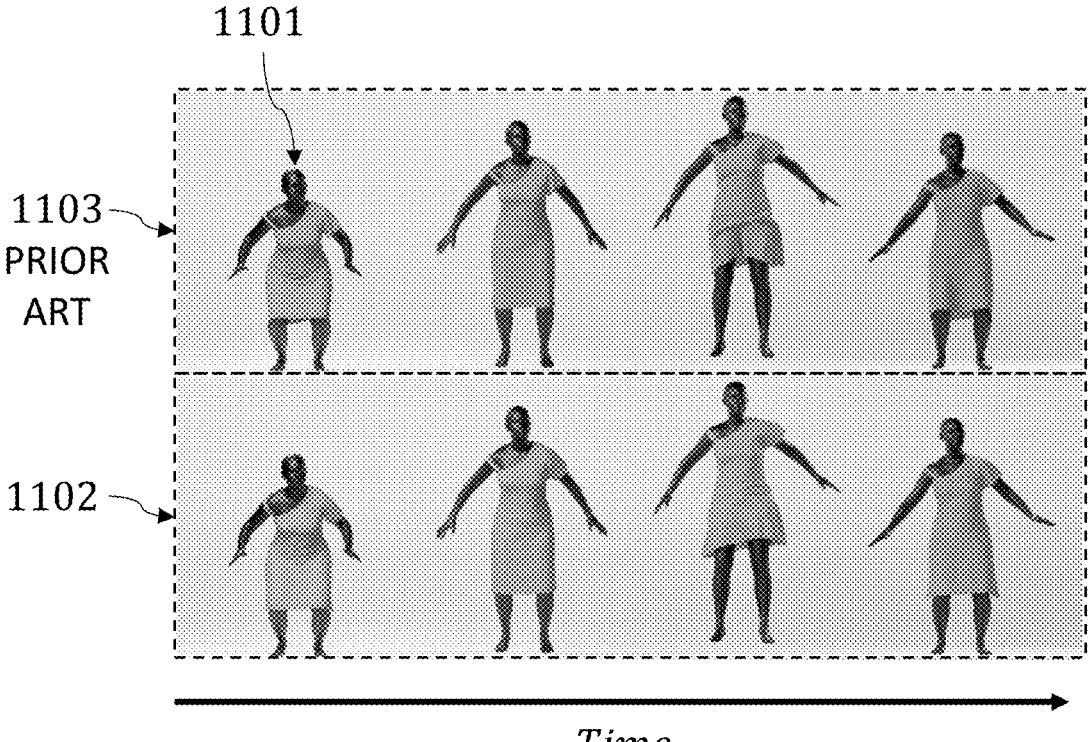
FIG. 11 is an illustration of computer generated simulations of a video sequence illustrating motion of a human body model based on two simulations for qualitative comparison of an embodiment of this disclosure compared to a prior art approach. The figures depict various example embodiments of the present disclosure for purposes of illustration only. One of ordinary skill in the art will readily recognize form the following discussion that other example embodiments based on alternative structures and methods may be implemented without departing from the principles of this disclosure and which are encompassed within the scope of this disclosure.

Now referring to FIG. 11, an illustration of computer renderings of a human body model 1101 in two multi-frame motion simulations for qualitative comparison. FIG. 11 illustrates the generalization capabilities of the approach according to embodiments of this disclosure to unseen motions, comparing its results 1102 with those of a physics-based simulator 1103. FIG. 11 illustrates the performance of embodiments of this disclosure in a highly-challenging scenario, featuring a dress sequence with motion induced dynamics deforming the garment.

Runtime Performance

According to embodiments, a system may include a computer with one or more processors, including CPUs and GPUs, and computer readable memory. For example, in one embodiment the system includes a regular desktop PC equipped with an AMD Ryzen 7 2700 CPU, an Nvidia GTX 1080 Ti GPU, and 32 GB of RAM. Table 2 shows the runtime performance of a model according to this embodiment.

TABLE 2

|  | Triangles | Regressor | Decoder | Projection |
|---|---|---|---|---|
| T-Shirt | 8,710 | 1.7 ms | 1.6 ms | 1.4 ms |
| Dress | 23,949 | 1.7 ms | 3.5 ms | 2.9 ms |

In Table 2, the execution time of each step of a method according to the illustrative embodiment noted above is provided. This model is capable of generating detailed results at very high frame rates, even for garments with many triangles.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. These modules may be implemented in server-based systems interacting with client systems over a computer network, such as the Internet, over which the results obtained with the modules are communicated to the client systems for output to users. For example, in computer graphics applications, realistic graphics with modeled garments using the approaches described in this disclosure are computed at the servers, for example, based on input data transmitted by the client, and communicated to client systems for display, for example as computer encoded video frames or other image data. Alternatively, the modules may be implemented in client systems, for example, in design applications or client-based graphics applications, such as for example computer gaming applications.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following.

REFERENCES

The following references are incorporated herein for all purposes:

[1] Thiemo Alldieck, Marcus Magnor, Bharat Lal Bhatnagar, Christian Theobalt, and Gerard Pons-Moll. Learning to Reconstruct People in Clothing from a Single RGB Camera. In Proc. of Computer Vision and Pattern Recognition (CVPR), 2019.

[2] Matan Atzmon and Yaron Lipman. SAL: Sign Agnostic Learning of Shapes from Raw Data. In Proc. of Computer Vision and Pattern Recognition (CVPR), 2020.

[3] Jan Bender, Matthias Muller, Miguel A Otaduy, Matthias Teschner, and Miles Macklin. A Survey on Position-Based Simulation Methods in Computer Graphics. Computer Graphics Forum, 33(6):228-251, 2014.

[4] Hugo Bertiche, Meysam Madadi, and Sergio Escalera. CLOTH3D: Clothed 3D Humans. In Proc. of European Conference on Computer Vision (ECCV), 2020.

[5] Kiran S. Bhat, Christopher D. Twigg, Jessica K. Hodgins, Pradeep K. Khosla, Zoran Popović, and Steven M. Seitz. Estimating Cloth Simulation Parameters from Video. In Proc. of ACM SIGGRAPH/Eurographics Symposium on Computer Animation, page 37-51, 2003.

[6] Sofien Bouaziz, Sebastian Martin, Tiantian Liu, Ladislav Kavan, and Mark Pauly. Projective Dynamics: Fusing Constraint Projections for Fast Simulation. ACM Transactions on Graphics (Proc. SIGGRAPH), 33(4):1-11, 2014.

[7] Katherine L Bouman, Bei Xiao, Peter Battaglia, and William T Freeman. Estimating the Material Properties of Fabric from Video. In Proc. of Computer Vision and Pattern Recognition (CVPR), pages 1984-1991, 2013.

[8] Dan Casas, Marco Volino, John Collomosse, and Adrian Hilton. 4D Video Textures for Interactive Character Appearance. Computer Graphics Forum (Proc. Eurographics), 33(2):371-380, 2014.

[9] Zhiqin Chen and Hao Zhang. Learning Implicit Fields for Generative Shape Modeling. In Proc. of Computer Vision and Pattern Recognition (CVPR), 2019.

[10] Kyunghyun Cho, Bart van Merrisnboer, Caglar Gulcehre, Dzmitry Bahdanau, Fethi Bougares, Holger Schwenk, and Yoshua Bengio. Learning Phrase Representations using RNN Encoder-Decoder for Statistical Machine Translation. In Proc. of the Conference on Empirical Methods in Natural Language Processing (EMNLP), 2014.

[11] Andrew Feng, Dan Casas, and Ari Shapiro. Avatar Reshaping and Automatic Rigging Using a Deformable Model. In Proc. of ACM SIGGRAPH Conference on Motion in Games (MIG), page 57-64, 2015.

[12] Marco Fratarcangeli, Valentina Tibaldo, and Fabio Pellacini. Vivace: a Practical Gauss-Seidel Method for Stable Soft Body Dynamics. ACM Transactions on Graphics (Proc. SIGGRAPH Asia), 35(6):1-9, 2016.

[13] Valentin Gabeur, Jean-Sebastien Franco, Xavier Martin, Cordelia Schmid, and Gregory Rogez. Moulding Humans: Non-parametric 3D Human Shape Estimation from Single Images. In Proc. of Computer Vision and Pattern Recognition (CVPR), pages 2232-2241, 2019.

[14] Kyle Genova, Forrester Cole, Daniel Vlasic, Aaron Sarna, William T Freeman, and Thomas Funkhouser. Learning Shape Templates With Structured Implicit Functions. In Proc. of Computer Vision and Pattern Recognition (CVPR), 2019.

[15] Peng Guan, Loretta Reiss, David A Hirshberg, Alexander Weiss, and Michael J Black. DRAPE: DRessing Any PErson. ACM Transactions on Graphics (Proc. SIGGRAPH), 31(4), 2012.

[16] Erhan Gundogdu, Victor Constantin, Amrollah Seifoddini, Minh Dang, Mathieu Salzmann, and Pascal Fua. GarNet: A two-stream network for fast and accurate 3D cloth draping. In Proc. of IEEE International Conference on Computer Vision (ICCV), 2019.

[17] Marc Habermann, Weipeng Xu, Michael Zollhofer, Gerard Pons-Moll, and Christian Theobalt. DeepCap: Monocular Human Performance Capture Using Weak Supervision. In Proc. of IEEE/CVF Conference on Computer Vision and Pattern Recognition (CVPR), 2020.

[18] Xintong Han, Zuxuan Wu, Zhe Wu, Ruichi Yu, and Larry S Davis. Viton: An image-based virtual try-on network. In Proceedings of the IEEE conference on computer vision and pattern recognition, pages 7543-7552, 2018.

[19] Zeng Huang, Yuanlu Xu, Christoph Lassner, Hao Li, and Tony Tung. ARCH: Animatable Reconstruction of Clothed Humans. In Proc. of IEEE/CVF Conference on Computer Vision and Pattern Recognition, pages 3093-3102, 2020.

[20] Ning Jin, Yilin Zhu, Zhenglin Geng, and Ron Fedkiw. A Pixel-Based Framework for Data-Driven Clothing. Computer Graphics Forum (Proc. of SCA), 2020.

[21] Hanbyul Joo, Tomas Simon, and Yaser Sheikh. Total Capture: A 3D Deformation Model for Tracking Faces, Hands, and Bodies. In Proc. of Computer Vision and Pattern Recognition (CVPR), 2018.

[22] Ladislav Kavan, Dan Gerszewski, Adam W. Bargteil, and Peter-Pike Sloan. Physics-Inspired Upsampling for Cloth Simulation in Games. In Proc. of ACM SIGGRAPH, 2011.

[23] Meekyoung Kim, Gerard Pons-Moll, Sergi Pujades, Seungbae Bang, Jinwook Kim, Michael J. Black, and Sung-Hee Lee. Data-Driven Physics for Human Soft Tissue Animation. ACM Transactions on Graphics (Proc. SIGGRAPH), 36(4), 2017.

[24] Zorah Lahner, Daniel Cremers, and Tony Tung. Deep-wrinkles: Accurate and realistic clothing modeling. In Proc. of European Conference on Computer Vision (ECCV), 2018.

[25] Christoph Lassner, Gerard Pons-Moll, and Peter V Gehler. A Generative Model of People in Clothing. In Proc. of IEEE International Conference on Computer Vision (ICCV), pages 853-862, 2017.

[26] Yongjoon Lee, Sung-eui Yoon, Seungwoo Oh, Duksu Kim, and Sunghee Choi. Multi-Resolution Cloth Simulation. 29(7):2225-2232, 2010.

[27] John P Lewis, Matt Cordner, and Nickson Fong. Pose Space Deformation: A Unified Approach to Shape Interpolation and Skeleton-Driven Deformation. In Proc. of the Annual Conference on Computer Graphics and Interactive Techniques, pages 165-172, 2000.

[28] Jie Li, Gilles Daviet, Rahul Narain, Florence Bertails-Descoubes, Matthew Overby, George E Brown, and Laurence Boissieux. An Implicit Frictional Contact Solver for Adaptive Cloth Simulation. ACM Transactions on Graphics (Proc. SIGGRAPH), 37(4):1-15, 2018.

[29] Matthew Loper, Naureen Mahmood, Javier Romero, Gerard Pons-Moll, and Michael J Black. Smpl: A skinned multiperson linear model. ACM Transactions on Graphics (Proc. SIGGRAPH Asia), 34(6):1-16, 2015.

[30] Mickasl Ly, Jean Jouve, Laurence Boissieux, and Florence Bertails-Descoubes. Projective Dynamics with Dry Frictional Contact. ACM Transactions on Graphics (Proc. SIGGRAPH), 39(4), 2020.

[31] Qianli Ma, Jinlong Yang, Anurag Ranjan, Sergi Pujades, Gerard Pons-Moll, Siyu Tang, and Michael J. Black. Learning to Dress 3D People in Generative Clothing. In Proc. of Computer Vision and Pattern Recognition (CVPR), 2020.

[32] Naureen Mahmood, Nima Ghorbani, Nikolaus F. Troje, Gerard Pons-Moll, and Michael J. Black. AMASS: Archive of Motion Capture as Surface Shapes. In Proc. of IEEE International Conference on Computer Vision (ICCV), pages 5442-5451, Oct. 2019.

[33] Lars Mescheder, Michael Oechsle, Michael Niemeyer, Sebastian Nowozin, and Andreas Geiger. Occupancy Networks: Learning 3D Reconstruction in Function Space. In Proc. of Computer Vision and Pattern Recognition (CVPR), 2019.

[34] Eder Miguel, Derek Bradley, Bernhard Thomaszewski, Bernd Bickel, Wojciech Matusik, Miguel A Otaduy, and Steve Marschner. Data-driven estimation of cloth simulation models. Computer Graphics Forum (Proc. Eurographics), 31:519-528, 2012.

[35] Ben Mildenhall, Pratul P. Srinivasan, Matthew Tancik, Jonathan T. Barron, Ravi Ramamoorthi, and Ren Ng. NeRF: Representing Scenes as Neural Radiance Fields for View Synthesis. In Proc. of European Conference on Computer Vision (ECCV), 2020.

[36] Domen Mongus, Blaz Repnik, Marjan Mernik, and B Žalik. A hybrid evolutionary algorithm for tuning a clothsimulation model. Applied Soft Computing, 12(1): 266-273, 2012.

[37] Rahul Narain, Armin Samii, and James F O'brien. Adaptive Anisotropic Remeshing for Cloth Simulation. ACM Transactions on Graphics (Proc. SIGGRAPH Asia), 31(6):1-10, 2012.

[38] Andrew Nealen, Matthias Müller, Richard Keiser, Eddy Boxerman, and Mark Carlson. Physically Based Deform-able Models in Computer Graphics. Computer Graphics Forum, 25(4):809-836, 2006.

[39] Hayato Onizuka, Zehra Hayirci, Diego Thomas, Akihiro Sugimoto, Hideaki Uchiyama, and Rin-ichiro Taniguchi. TetraTSDF: 3D Human Reconstruction From a Single Image With a Tetrahedral Outer Shell. In Proc. of IEEE/CVF Conference on Computer Vision and Pattern Recognition (CVPR), pages 6011-6020, 2020.

[40] Jeong Joon Park, Peter Florence, Julian Straub, Richard Newcombe, and Steven Lovegrove. DeepSDF: Learning Continuous Signed Distance Functions for Shape Representation. In Proc. of Computer Vision and Pattern Recognition (CVPR), 2019.

[41] Chaitanya Patel, Zhouyingcheng Liao, and Gerard Pons-Moll. The Virtual Tailor: Predicting Clothing in 3D as a Function of Human Pose, Shape and Garment Style. In Proc. of Computer Vision and Pattern Recognition (CVPR), 2020.

[42] Gerard Pons-Moll, Sergi Pujades, Sonny Hu, and Michael J. Black. ClothCap: Seamless 4D clothing capture and retargeting. ACM Transactions on Graphics (Proc. SIGGRAPH), 36(4), 2017.

[43] Gerard Pons-Moll, Javier Romero, Naureen Mahmood, and Michael J. Black. Dyna: A Model of Dynamic Human Shape in Motion. ACM Transactions on Graphics (Proc. SIGGRAPH), 34(4), 2015.

[44] Albert Pumarola, Jordi Sanchez-Riera, Gary Choi, Alberto Sanfeliu, and Francesc Moreno-Noguer. 3DPeople: Modeling the Geometry of Dressed Humans. In Proc. of Computer Vision and Pattern Recognition (CVPR), pages 2242-2251, 2019.

[45] Charles R Qi, Hao Su, Kaichun Mo, and Leonidas J Guibas. PointNet: Deep Learning on Point Sets for 3D Classification and Segmentation. In Proc. of Computer Vision and Pattern Recognition (CVPR), pages 652-660, 2017.

[46] Abdullah-Haroon Rasheed, Victor Romero, Florence Bertails-Descoubes, Stefanie Wuhrer, Jean-Sebastien Franco, and Arnaud Lazarus. Learning to Measure the Static Friction Coefficient in Cloth Contact. In Proc. of Computer Vision and Pattern Recognition (CVPR), 2020.

[47] Nadia Robertini, Dan Casas, Edilson De Aguiar, and Christian Theobalt. Multi-view performance capture of surface details. International Journal of Computer Vision, 124(1):96-113, 2017.

[48] Nadia Robertini, Dan Casas, Helge Rhodin, Hans-Peter Seidel, and Christian Theobalt. Model-Based Outdoor Performance Capture. In Proc. of International Conference on 3D Vision (3DV), pages 166-175, 2016.

[49] Cristian Romero, Miguel A. Otaduy, Dan Casas, and Jesus Perez. Modeling and Estimation of Nonlinear Skin Mechanics for Animated Avatars. Computer Graphics Forum (Proc. Eurographics), 39(2), 2020.

[50] Tom F. H. Runia, Kirill Gavrilyuk, Cees G. M. Snoek, and Arnold W. M. Smeulders. Cloth in the Wind: A Case Study of Physical Measurement Through Simulation. In Proc. of IEEE/CVF Conference on Computer Vision and Pattern Recognition (CVPR), 2020.

[51] Shunsuke Saito, Zeng Huang, Ryota Natsume, Shigeo Morishima, Angjoo Kanazawa, and Hao Li. PIFu: Pixel-Aligned Implicit Function for High-Resolution Clothed Human Digitization. In Proc. of IEEE International Conference on Computer Vision (ICCV), 2019.

[52] Igor Santesteban, Elena Garces, Miguel A. Otaduy, and Dan Casas. SoftSMPL: Data-driven Modeling of Nonlinear Softtissue Dynamics for Parametric Humans. Computer Graphics Forum (Proc. Eurographics), 39(2), 2020.

[53] Igor Santesteban, Miguel A. Otaduy, and Dan Casas. Learning-Based Animation of Clothing for Virtual Try-On. Computer Graphics Forum (Proc. Eurographics), 38(2), 2019.

[54] Yu Shen, Junbang Liang, and Ming C. Lin. GAN-based Garment Generation Using Sewing Pattern Images. In Proc. of European Conference on Computer Vision (ECCV), 2020.

[55] Vincent Sitzmann, Julien N. P. Martel, Alexander W. Bergman, David B. Lindell, and Gordon Wetzstein. Implicit Neural Representations with Periodic Activation Functions. In Proc. NeurIPS, 2020.

[56] Vincent Sitzmann, Michael Zollhöfer, and Gordon Wetzstein. Scene Representation Networks: Continuous 3 DStructure-Aware Neural Scene Representations. In Advances in Neural Information Processing Systems, pages 1121-1132, 2019.

[57] Carsten Stoll, Juergen Gall, Edilson De Aguiar, Sebastian Thrun, and Christian Theobalt. Video-based reconstruction of animatable human characters. ACM Transactions on Graphics (Proc. SIGGRAPH Asia), 29(6), 2010.

[58] Min Tang, Huamin Wang, Le Tang, Ruofeng Tong, and Dinesh Manocha. CAMA: Contact-Aware Matrix Assembly with Unified Collision Handling for GPU-based Cloth Simulation. Computer Graphics Forum, 35(2), 2016.

[59] Min Tang, Tongtong Wang, Zhongyuan Liu, Ruofeng Tong, and Dinesh Manocha. I-Cloth: Incremental Collision Handling for GPU-Based Interactive Cloth Simulation. ACM Transactions on Graphics (Proc. SIGGRAPH Asia), 37(6), 2018.

[60] Gabriel Taubin. A signal processing approach to fair surface design. In Proceedings of the 22nd Annual Conference on Computer Graphics and Interactive Techniques, SIGGRAPH '95, page 351-358, New York, NY, USA, 1995. Association for Computing Machinery.

[61] Garvita Tiwari, Bharat Lal Bhatnagar, Tony Tung, and Gerard Pons-Moll. SIZER: A Dataset and Model for Parsing 3D Clothing and Learning Size Sensitive 3D Clothing. In Proc. of European Conference on Computer Vision (ECCV), 2020.

[62] Raquel Vidaurre, Igor Santesteban, Elena Garces, and Dan Casas. Fully Convolutional Graph Neural Networks for Parametric Virtual Try-On. Computer Graphics Forum (Proc. SCA), 39(8), 2020.

[63] Huamin Wang, James F O'Brien, and Ravi Ramamoorthi. Data-Driven Elastic Models for Cloth: Modeling and Measurement. ACM Transactions on Graphics (Proc. SIGGRAPH), 30(4):1-12, 2011.

[64] Tuanfeng Y Wang, Duygu Ceylan, Jovan Popovi32ć, and Niloy J Mitra. Learning a Shared Shape Space for Multimodal Garment Design. ACM Transactions on Graphics (Proc. SIGGRAPH Asia), 37(6), 2018.

[65] Tuanfeng Y Wang, Tianjia Shao, Kai Fu, and Niloy J Mitra. Learning an Intrinsic Garment Space for Interactive Authoring of Garment Animation. ACM Transactions on Graphics (Proc. SIGGRAPH Asia), 38(6), 2019.

[66] Jiajun Wu, Joseph J Lim, Hongyi Zhang, Joshua B Tenenbaum, and William T Freeman. Physics 101: Learning Physical Object Properties from Unlabeled Videos. In The British Machine Vision Conference (BMVC), 2016.

[67] Hongyi Xu, Eduard Gabriel Bazavan, Andrei Zanfir, William T Freeman, Rahul Sukthankar, and Cristian Sminchisescu. GHUM & GHUML: Generative 3D Human Shape and Articulated Pose Models. In Proceedings of the IEEE/CVF Conference on Computer Vision and Pattern Recognition, pages 6184-6193, 2020.

[68] Jinlong Yang, Jean-Sebastien Franco, Franck Hétroy-Wheeler, and Stefanie Wuhrer. Analyzing Clothing Layer Deformation Statistics of 3D Human Motions. In Proc. Of European Conference on Computer Vision (ECCV), 2018.

[69] Shan Yang, Junbang Liang, and Ming C. Lin. Learning-Based Cloth Material Recovery From Video. In Proc. Of IEEE International Conference on Computer Vision (ICCV), 2017.

[70] Tao Yu, Zerong Zheng, Yuan Zhong, Jianhui Zhao, Qionghai Dai, Gerard Pons-Moll, and Yebin Liu. Simulcap: Singleview human performance capture with cloth simulation. In Proc. of IEEE/CVF Conference on Computer Vision and Pattern Recognition (CVPR), 2019.

[71] Chao Zhang, Sergi Pujades, Michael J Black, and Gerard Pons-Moll. Detailed, accurate, human shape estimation from clothed 3d scan sequences. In Proc. of Computer Vision and Pattern Recognition (CVPR), pages 4191-4200, 2017. 2

[72] Heming Zhu, Yu Cao, Hang Jin, Weikai Chen, Dong Du, Zhangye Wang, Shuguang Cui, and Xiaoguang Han. Deep Fashion3D: A Dataset and Benchmark for 3D Garment Reconstruction from Single Images. In Proc. of European Conference on Computer Vision (ECCV), 2020.

[73] Javier S Zurdo, Juan P Brito, and Miguel A Otaduy. Animating Wrinkles by Example on Non-Skinned Cloth. IEEE Transactions on Visualization and Computer Graphics (TVCG), 19(1):149-158, 2012.

[74] BERGOU M., MATHUR S., WARDETZKY M., GRINSPUN E.: TRACKS: Toward Directable Thin Shells. ACM Transactions on Graphics (SIGGRAPH) 26, 3 (jul 2007), 50:1-50:10.

[75] BRADLEY D., POPA T., SHEFFER A., HEIDRICH W., BOUBEKEUR T.: Markerless garment capture. ACM Trans. Graphics (Proc. SIGGRAPH) 27, 3 (2008), 99.

[76] BROUET R., SHEFFER A., BOISSIEUX L., CANI M.-P.: Design preserving garment transfer. ACM Trans. Graph. 31, 4 (2012), 36:1-36:11.

[77] CIRIO G., LOPEZ-MORENO J., MIRAUT D., OTADUY M. A.: Yarn-level simulation of woven cloth. ACM Transactions on Graphics (Proc. of ACM SIGGRAPH Asia) 33, 6 (2014).

[78] DE AGUIAR E., SIGAL L., TREUILLE A., HODGINS J. K.: Stable spaces for real-time clothing. ACM Transactions on Graphics 29, 4 (July 2010), 106:1-106:9.

[79] HILSMANN A., FECHTELER P., EISERT P.: Pose space image based rendering. In Computer Graphics Forum (2013), vol. 32, pp. 265-274.

[80] HAUSWIESNER S., STRAKA M., REITMAYR G.: Virtual try-on through image-based rendering. IEEE Transactions on Visualization and Computer Graphics (TVCG) 19, 9 (2013), 1552-1565.

[81] HAHN F., THOMASZEWSKI B., COROS S., SUMNER R. W., COLE F., MEYER M., DEROSE T., GROSS M.: Subspace Clothing Simulation Using Adaptive Bases. ACM Transactions on Graphics 33, 4 (jul 2014), 105:1-105:9.

[82] JAMES D. L., FATAHALIAN K.: Precomputing Interactive Dynamic Deformable Scenes. ACM Transactions on Graphics (Proc. SIGGRAPH) 22, 3 (jul 2003), 879-887.

[83] JAIN A., THORMAHLEN T., SEIDEL H.-P., THEOBALT C.: MovieReshape: Tracking and Reshaping of Humans in Videos. ACM Transactions on Graphics (Proc. SIGGRAPH Asia 2010) 29, 5 (2010).

[84] KIM D., KOH W., NARAIN R., FATAHALIAN K., TREUILLE A., O'BRIEN J. F.: Near-exhaustive precomputation of secondary cloth effects. ACM Transactions on Graphics 32, 4 (2013).

[85] KALDOR J. M., JAMES D. L., MARSCHNER S.: Simulating knitted cloth at the yarn level. ACM Trans. Graph. 27, 3 (2008), 65:1-65:9.

[86] KIM T.-Y., VENDROVSKY E.: Drivenshape: a data-driven approach for shape deformation. In Proceedings of the 2008 ACM SIGGRAPH/Eurographics Symposium on Computer Animation (2008), Eurographics Association, pp. 49-55.

[87] LAHNER Z., CREMERS D., TUNG T.: Deepwrinkles: Accurate and realistic clothing modeling. In European Conference on Computer Vision (ECCV) (2018).

[88] NEOPHYTOU A., HILTON A.: Shape and pose space deformation for subject specific animation. In 3DV (2013), pp. 334-341.

[89] NARAIN R., SAMII A., O'BRIEN J. F.: Adaptive anisotropic remeshing for cloth simulation. ACM Transactions on Graphics 31, 6 (Nov. 2012), 152:1-152:10.

[90] OVERBY M., BROWN G. E., LI J., NARAIN R.: ADMM Projective Dynamics: Fast Simulation of Hyperelastic Models with Dynamic Constraints. IEEE.

[91] OH Y. J., LEE T. M., LEE I.-K.: Hierarchical cloth simulation using deep neural networks. In Proceedings of Computer Graphics International 2018 (2018), CGI 2018, pp. 139-146.

[92] ROHMER D., POPA T., CANI M.-P., HAHMANN S., SHEFFER A.: Animation wrinkling: augmenting coarse cloth simulations with realistic-looking wrinkles. In ACM Transactions on Graphics (TOG) (2010), vol. 29, ACM, p. 157.

[93] SCHOLZ V., MAGNOR M.: Texture replacement of garments in monocular video sequences. In Eurographics Conference on Rendering Techniques (2006), pp. 305-312.

[94] SELLE A., SU J., IRVING G., FEDKIW R.: Robust high-resolution cloth using parallelism, history-based collisions, and accurate friction. IEEE Transactions on Visualization and Computer Graphics 15, 2 (Mar. 2009), 339-350.

[95] WANG H., HECHT F., RAMAMOORTHI R., O'BRIEN J.: Example-based wrinkle synthesis for clothing animation. ACM Transactions on Graphics 29, 4 (2010).

[96] WEIDNER N. J., PIDDINGTON K., LEVIN D. I. W., SUEDA S.: Eulerian-on-lagrangian cloth simulation. ACM Transactions on Graphics 37, 4 (2018), 50:1-50:11.Transactions on Visualization and Computer Graphics 23, 10 (Oct 2017), 2222-2234.

[97] XU W., UMENTANI N., CHAO Q., MAO J., JIN X., TONG X.: Sensitivity-optimized Rigging for Example-based Real-time Clothing Synthesis. ACM Transactions on Graphics 33, 4 (jul 2014), 107:1-107:11.

[98] ZHANG C., PUJADES S., BLACK M. J., PONS-MOLL G.: Detailed, Accurate, Human Shape Estimation From Clothed 3D Scan Sequences. In The IEEE Conference on Computer Vision and Pattern Recognition (CVPR) (July 2017).

[99] ZHOU Z., SHU B., ZHUO S., DENG X., TAN P., LIN S.: Image-based clothes animation for virtual fitting. In SIGGRAPH Asia 2012 Technical Briefs (2012), ACM, p. 33.

The invention claimed is:

1. A computer-implemented method for generating a digital representation of clothing on a body, the method comprising:

modeling a body with a body model;

modeling the clothing with a garment model, the garment model configured to be modified based on a first set of garment model deformations due to, at least in part, the body model;

finding a subspace representation of a plurality of garment model deformations, wherein each garment model deformation in the subspace representation, when applied to the garment model, does not cause the garment model to collide with the body model;

training a regressor to generate an instance of a garment model deformation from the subspace representation as a function of the body model;

subjecting the garment model to the regressor to deform the garment model with the instance of the garment model deformation from the subspace representation as a function of an input body shape and an input body motion; and outputting a predicted garment deformation corresponding to the input body shape and the input body motion, wherein the predicted garment deformation corresponds, at least in part, to a sliding of the clothing over the surface of the body modeled by the body model.

2. The computer-implemented method of claim 1, wherein the body model comprises body parameters, the body parameters including a body shape parameter and a motion parameter.

3. The method of claim 2, wherein the garment model is configured to be modified based on garment model deformations due to, at least in part, one or more of the body parameters.

4. The computer-implemented method of claim 2, wherein training the regressor to generate a subspace garment deformation is further as a function of the body shape parameter and the motion parameter.

5. The computer-implemented method of claim 2, wherein the body model further models a second set of garment deformations due to the body parameters and further wherein the first set of garment model deformations are represented in a canonical space that removes the second set of garment deformations from the garment model.

6. The computer-implemented method of claim 5, wherein the subspace representation comprises a generative subspace.

7. The computer-implemented method of claim 6, further comprising training the generative subspace based on training data obtained by projecting simulation data to the canonical space, wherein the simulation data comprises physically-simulated versions of the clothing using the garment model and the body model parameters.

8. The computer-implemented method of claim 7, wherein the projecting of simulation data to the canonical space comprises an optimization function that deforms the physically-simulated versions of the clothing.

9. The computer-implemented method of claim 2, further comprising:

providing an output template mesh of the clothing reflecting the predicted garment deformation.

10. The computer-implemented method of claim 9, further comprising generating a digital image including the digital representation of the clothing on the body based on the output template mesh.

11. The computer-implemented method of claim 9, wherein the body model further models a second set of garment deformations due to the body parameters and further wherein the first set of garment deformations are represented in a canonical space that removes the second set of garment deformations from the garment model.

12. The computer-implemented method of claim 11, wherein providing the output template mesh further comprises projecting the predicted garment deformation from the canonical space to a body pose space.

13. The computer-implemented method of claim 12, wherein providing the output template mesh further comprises skinning the body model based on the body pose space projected predicted garment deformation by combining the second set of garment deformations from the body model with the body pose projected predicted garment deformation to generate the output template mesh.

14. The computer-implemented method of claim 2, wherein the predicted garment deformation corresponds, at least in part, to a fit of the clothing on the body based on the body shape parameter of the body model.

15. The computer-implemented method of claim 1, wherein the subspace representation comprises a generative subspace.

16. The computer-implemented method of claim 15, wherein the generative subspace is implemented, at least in part, with a variational autoencoder.

17. The computer-implemented method of claim 1, wherein the finding a subspace representation further comprises training a generative neural network.

18. The computer-implemented method of claim 17, wherein the neural network training further comprises fine-tunning the neural network based on a measure of collisions between the body model and the garment model deformed with randomly sampled garment deformations.

19. The computer-implemented method of claim 1, wherein the predicted garment deformation corresponds, at least in part, to wrinkles in the clothing due to the input body shape and the input body motion.

20. The computer-implemented method of claim 1, wherein the regressor includes one or more Gated Recurrent Units and further wherein the deforming of the garment model is based on a dynamic effect that depend on a previous input body motion.

21. A system for generating a digital representation of clothing on a body, the system comprising a processor and non-transitory computer readable media comprising instructions that when executed by the processor configures the processor to:

model a body with a body model;

model the clothing with a garment model, the garment model configured to be modified based on a first set of garment model deformations due to, at least in part, the body model;

find a subspace representation of a plurality of garment model deformations, wherein each garment model deformation in the subspace representation, when applied to the garment model, does not cause the garment model to collide with the body model;

train a regressor to generate an instance of a garment model deformation from the subspace representation as a function of the body model;

subject the garment model to the regressor to deform the garment model with the instance of the garment model deformation from the subspace representation as a function of an input body shape and an input body motion; and output a predicted garment deformation corresponding to the input body shape and the input body motion, wherein the predicted garment deformation corresponds, at least in part, to a sliding of the clothing over the surface of the body modeled by the body model.

22. The system of claim 21, wherein the processor is a distributed processor including a plurality of processing units communicatively coupled via a computer network.

23. A system for displaying a digital representation of clothing on a body, the system comprising a processor and non-transitory computer readable media comprising instructions that when executed by the processor configures the processor to:

transmit a body model input, the body model input identifying an input body shape and an input body motion associated with a body model, the body model for modeling the body, and including body model parameters comprising a body shape parameter and a motion parameter;

transmit a garment model input, the garment model input associated with a garment model for modeling the clothing, the garment model configured to be modified based on garment model deformations due to, at least in part, one or more of the body parameters;

receive the digital representation of the clothing on the body, the digital representation based on processing of the garment model by subjecting the garment model to a regressor to deform the garment model based on the input body shape and an input body motion, the regressor configured to generate an output garment deformation that is processed with a neural network to generate a predicted garment deformation corresponding to the input body shape and the input body motion, wherein the neural network is trained to encode a plurality of garment deformations as a function of the body shape parameter and the motion parameter and to generate the predicted garment deformation for the plurality of garment deformations that does not collide with the body model, wherein the predicted garment deformation corresponds, at least in part, to a sliding of the clothing over the surface of the body modeled by the body model; and display a video frame of a plurality of video frames, the video frame generated based on the digital representation of the clothing on the body.

* * * * *